US008787279B2

(12) United States Patent
Benjebbour et al.

(10) Patent No.: US 8,787,279 B2
(45) Date of Patent: *Jul. 22, 2014

(54) RADIO COMMUNICATION SYSTEM, CENTRALIZED STATION, CONTROL STATION APPARATUS, RADIO BASE STATION AND COORDINATED TRANSMISSION METHOD FOR DETERMINING AN ASSIGNMENT OF CLUSTER PATTERNS

(75) Inventors: Anass Benjebbour, Kanagawa (JP); Yukihiko Okumura, Kanagawa (JP); Yusuke Ohwatari, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 13/191,645

(22) Filed: Jul. 27, 2011

(65) Prior Publication Data

US 2012/0026956 A1    Feb. 2, 2012

(30) Foreign Application Priority Data

Jul. 28, 2010   (JP) ................................. 2010-169762

(51) Int. Cl.
*H04W 28/04* (2009.01)
(52) U.S. Cl.
USPC ........................................................ 370/329
(58) Field of Classification Search
USPC ......... 370/208, 210, 310, 328, 329, 342, 330; 375/299, 342; 455/65, 447, 450, 507, 455/444, 501
See application file for complete search history.

(56) References Cited

U.S. PATENT DOCUMENTS

| 5,307,507 | A * | 4/1994 | Kanai ........................... 455/447 |
| 2006/0109865 | A1* | 5/2006 | Park et al. ...................... 370/482 |
| 2007/0249402 | A1* | 10/2007 | Dong et al. ................. 455/562.1 |
| 2008/0049672 | A1* | 2/2008 | Barak et al. .................... 370/330 |
| 2008/0090575 | A1* | 4/2008 | Barak et al. .................... 455/444 |
| 2008/0130790 | A1* | 6/2008 | Forenza et al. ................ 375/299 |
| 2008/0146238 | A1* | 6/2008 | Saito et al. ..................... 455/442 |
| 2009/0067402 | A1* | 3/2009 | Forenza et al. ................ 370/343 |
| 2009/0296663 | A1* | 12/2009 | Wild .............................. 370/335 |
| 2010/0214997 | A1* | 8/2010 | Tao et al. ........................ 370/329 |
| 2010/0298015 | A1* | 11/2010 | Medbo et al. .................. 455/501 |
| 2011/0080884 | A1* | 4/2011 | Ohwatari et al. ............. 370/329 |

FOREIGN PATENT DOCUMENTS

EP    2182663 A1 *  5/2010  ............ H04W 72/12

OTHER PUBLICATIONS

Extended European Search Report issued on Nov. 4, 2011 in the corresponding European Application No. 11175576.5.
Anass Benjebbour, et al., "Evaluation of User Throughput for MU-MIMO Coordinated Wireless Networks", IEEE PIMRC 2008, Sep. 2008, 5 pages.
"Downlink CoMP-MU-MIMO transmission Schemes", CMCC, 3GPP TSG-RAN WG1 #56, R1-090922, Feb. 9-13, 2009, 8 pages.

* cited by examiner

*Primary Examiner* — Otis L Thompson, Jr.
*Assistant Examiner* — Jael Ulysse
(74) *Attorney, Agent, or Firm* — Oblon, Spivak, McClelland, Maier & Neustadt, L.L.P.

(57) ABSTRACT

The radio communication system of the present invention is provided with a cluster pattern determining section that determines the assignment of each cluster pattern to each cluster so as to suppress inter-cluster interference with other neighboring clusters less than or equal to a predetermined value, the cluster pattern is defining a directional pattern of which directional beams emitted from the respective radio base stations face each other for each identical frequency block between neighboring sectors in a cluster composed of neighboring cells, the each cluster pattern being in different combinations of directional patterns and frequency blocks.

11 Claims, 24 Drawing Sheets

DIRECTIONAL PATTERN a

DIRECTIONAL PATTERN b

DIRECTIONAL PATTERN α

DIRECTIONAL PATTERN β

DIRECTIONAL PATTERN γ

CLUSTER PATTERN 1    CLUSTER PATTERN 2    CLUSTER PATTERN 3

CLUSTER PATTERN 1   CLUSTER PATTERN 2   CLUSTER PATTERN 3

RADIO COMMUNICATION SYSTEM, CENTRALIZED STATION, CONTROL STATION APPARATUS, RADIO BASE STATION AND COORDINATED TRANSMISSION METHOD FOR DETERMINING AN ASSIGNMENT OF CLUSTER PATTERNS

CROSS REFERENCE TO RELATED APPLICATION

This application is based upon and claims the benefit of priority from the prior Japanese Patent Application No. 2010-169762, filed on Jul. 28, 2010; the entire contents of which are incorporated herein by reference.

BACKGROUND OF THE INVENTION

1. Field of the Invention

The present invention relates to a radio communication system, centralized station, control station apparatus, radio base station and coordinated transmission method when transmitting a signal to a radio terminal by coordinating a plurality of radio base stations.

2. Description of the Related Art

Cellular-based mobile radio communication systems are required to decrease the frequency reuse as much as possible to improve area spectral efficiency. For example, a third-generation cellular scheme using a CDMA (Code Division Multiple Access) scheme realizes one-cell frequency reuse (i.e., the rate at which the same frequency can be used in the network=1) which uses a radio wave of the same frequency band between neighboring cells.

On the other hand, an OFDMA (Orthogonal Frequency Division Multiple Access) scheme is predominant for downlinks according to a next-generation cellular scheme. When one-cell frequency reuse is used in a cellular scheme using this OFDMA scheme, interference from a neighboring cell or neighboring sector is a dominant reason for performance degradation. To be more specific, as interference power from the neighboring cell or neighboring sector increases, an SINR (Signal-to-Interference and Noise power Ratio) decreases, and it is therefore difficult to obtain benefits thereof when performing MIMO (Multiple-Input Multiple-Output) transmission.

Therefore, when one-cell frequency reuse is used in a cellular scheme that performs MIMO transmission according to an OFDMA scheme, obtaining a notable benefit of increasing throughput by MIMO transmission requires interference from the neighboring cell or neighboring sector to be avoided.

Thus, as an interference avoidance technique in the above described case, coordinated transmission whereby signals are simultaneously transmitted to one or more radio terminals by coordinating a plurality of radio base stations is becoming a focus of attention. When a precoding method for multiuser MIMO transmission is used, it is possible to orthogonalize the space in a coordinated cluster formed of a set of cells or sectors of a plurality of coordinated radio base stations and thereby avoid interference in the coordinated cluster (that is, interference between radio base stations that perform coordinated transmission) (e.g., Non-Patent Document 1: A. Benjebbour, M. Shirakabe, Y. Ohwatari, J. Hagiwara, and T. Ohya, "Evaluation of user throughput for MU-MIMO coordinated wireless networks," IEEE PIMRC 2008, pp. 1-5, September 2008. Non-Patent Document 2: CMCC, "Downlink CoMP-MU-MIMO transmission schemes," 3GPP RAN1 #56, R1-090922, February 2009).

To be more specific, in the coordinated transmission described in Non-Patent Document 1, a plurality of neighboring radio base stations are connected to a centralized station and the centralized station coordinates the plurality of radio base stations. The coordinated cluster is formed of a set of cells of a plurality of coordinated radio base stations. In the coordinated cluster, the plurality of radio base stations perform coordinated transmission using multiuser MIMO transmission. When a block diagonalization Zero-forcing (BD-ZF) method is used as a precoding method of multiuser MIMO transmission, it is possible to orthogonalize the space in a coordinated cluster CL, and thereby avoid interference in the coordinated cluster CL and improve user throughput.

Furthermore, in the coordinated transmission described in Non-Patent Document 2, as shown in FIG. 1, three neighboring radio base stations (1-1, 1-2, 1-7), (1-1, 1-3, 1-4), (1-1, 1-5, 1-6) are connected to a centralized station 2 and in communication with a radio termina, the centralized station 2 coordinates three radio base stations which control an area in which the radio terminal is present. A coordinated cluster CL is formed of three neighboring sectors of three coordinated radio base stations 1. Furthermore, the three neighboring sectors constituting the coordinated cluster CL are configured so that beams from sector antennas of each radio base station 1 face each other. In the coordinated cluster CL, coordinated transmission is performed by the three radio base stations 1 through multiuser MIMO transmission. Use of a precoding method for multiuser MIMO transmission allows the space in the coordinated cluster CL to be orthogonalized, can thereby avoid interference in the coordinated cluster CL and improve user throughput and cell throughput.

However, the aforementioned interference avoidance technique can avoid interference in the coordinated cluster, but has a problem that the technique is unable to avoid interference between coordinated clusters.

SUMMARY OF THE INVENTION

The present invention has been implemented in view of the above problem and it is an object of the present invention to provide an intra-cluster coordination and inter-cluster interference avoidance method, radio communication system, centralized station and radio base station in coordinated transmission by a plurality of radio base stations, from which effects of avoiding not only interference within a coordinated cluster but also interference between coordinated clusters can be expected.

A radio communication system of the present invention is a radio communication system provided with a plurality of radio base stations each forming a cell with a plurality of sectors, including a cluster pattern determining section configured to determine the assignment of each cluster pattern to each cluster so as to suppress inter-cluster interference less than or equal to a predetermined value, the cluster pattern is defining a directional pattern of which directional beams emitted from the respective radio base stations face each other for each identical frequency block between neighboring sectors in a cluster composed of neighboring cells, the each cluster pattern being in different combinations of directional patterns and frequency blocks and a directional pattern determining section configured to assign directional patterns to the plurality of radio base stations in cluster units for each frequency block based on the cluster pattern determined by the cluster pattern determining section, wherein the plurality of radio base stations form directional beams according to the directional pattern in the same time slot and coordinate data transmission between sectors through multiuser MIMO transmission between directional beams of one radio base station and the other radio base station having sectors adjacent to each other in a cluster and facing each other at the same frequency.

Furthermore, a centralized station of the present invention is a centralized station in a radio communication system provided with a plurality of radio base stations each forming a cell with a plurality of sectors that integrates the radio base stations in units of a cluster composed of neighboring cells, including a cluster pattern determining section configured to determine the assignment of each cluster pattern to each cluster so as to suppress inter-cluster interference less than or equal to a predetermined value, the cluster pattern is defining a directional pattern of which directional beams emitted from the respective radio base stations face each other for each identical frequency block between neighboring sectors in the cluster, the each cluster pattern being in different combinations of directional patterns and frequency blocks, a directional pattern determining section configured to assign a directional pattern to the plurality of radio base stations in cluster units for each frequency block based on the cluster pattern determined by the cluster pattern determining section, a signal distribution section configured to distribute to a plurality of radio base stations of the same cluster data signals for coordinated transmission within the cluster, and a precoding section configured to precode the distributed data signals by the signal distribution section, the precoded data is transmitted on directional beams over the directional pattern assigned for each frequency block by the directional pattern determining section.

Furthermore, a control station apparatus of the present invention is a control station apparatus in a radio communication system provided with a plurality of radio base stations each forming a cell with a plurality of sectors that manages a centralized station that integrates the radio base stations in units of a cluster composed of neighboring cells, including a cluster pattern determining section configured to determine the assignment of each cluster pattern to each cluster so as to suppress inter-cluster interference less than or equal to a predetermined value, the cluster pattern is defining a directional pattern of which directional beams emitted from the respective radio base stations face each other for each identical frequency block between neighboring sectors in the cluster, the each cluster pattern being in different combinations of directional patterns and frequency blocks and a notifying section configured to notify the each centralized station of the cluster pattern determined by the cluster pattern determining section.

Furthermore, a radio base station of the present invention is a radio base station that forms a cell with a plurality of sectors together with other neighboring radio base stations in a radio communication system, including a cluster pattern determining section configured to determine the assignment of each cluster pattern to each cluster so as to suppress inter-cluster interference with other neighboring clusters less than or equal to a predetermined value, the cluster pattern is defining a directional pattern of which directional beams emitted from the respective radio base stations face each other for each identical frequency block between neighboring sectors in a cluster composed of neighboring cells, the each cluster pattern being indifferent combinations of directional patterns and frequency blocks, a directional pattern determining section configured to assign a directional pattern to the base station for each frequency block based on the cluster pattern determined by the cluster pattern determining section and a precoding section configured to form beams within a directional pattern assigned for each frequency block by the directional pattern determining section using multiuser MIMO precoding to transmit data signals in a coordinated manner in the cluster.

DETAILED DESCRIPTION OF THE INVENTION

Figure 1:
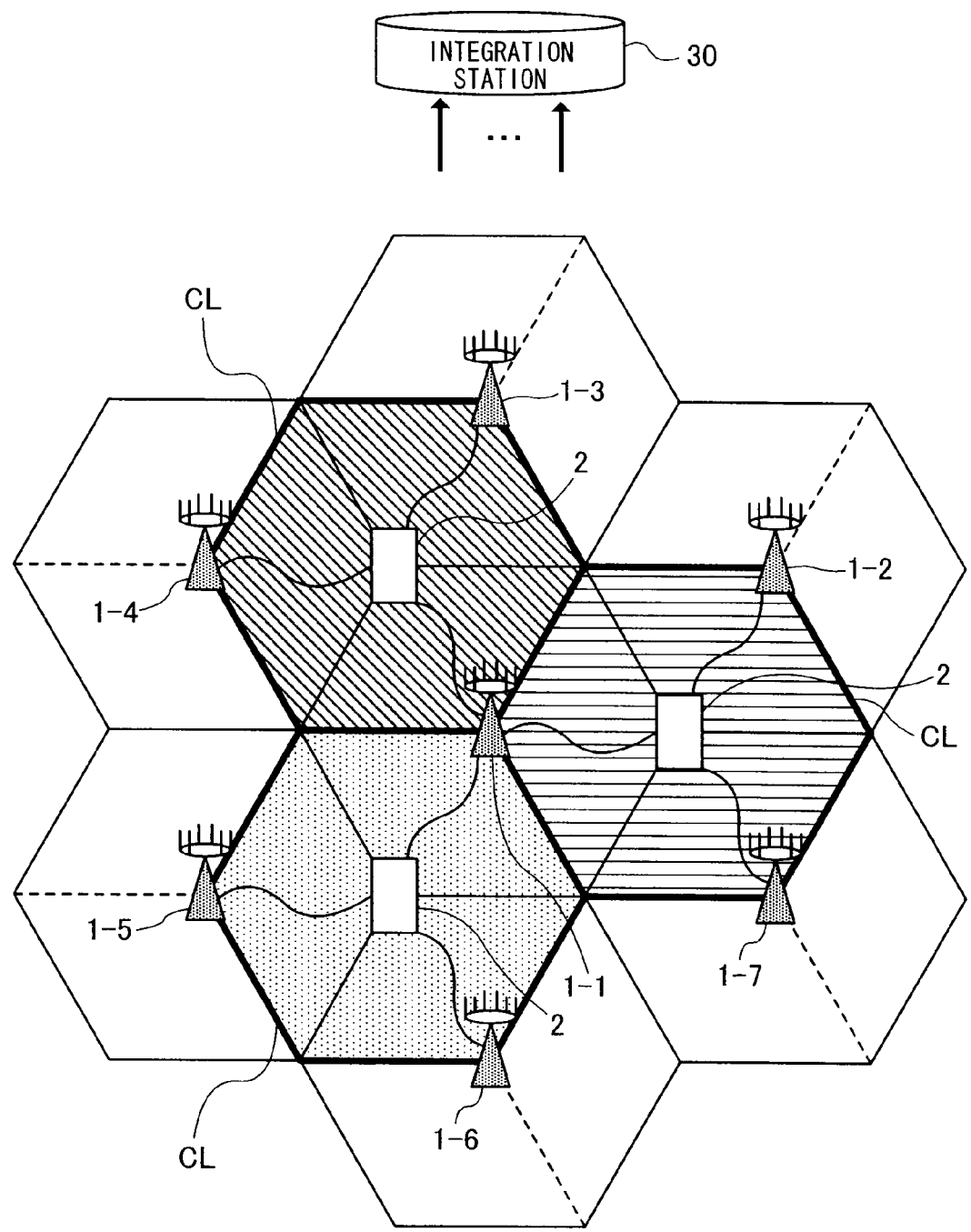
FIG. 1 is a diagram illustrating a conventional coordinated transmission system.
Figure 2:
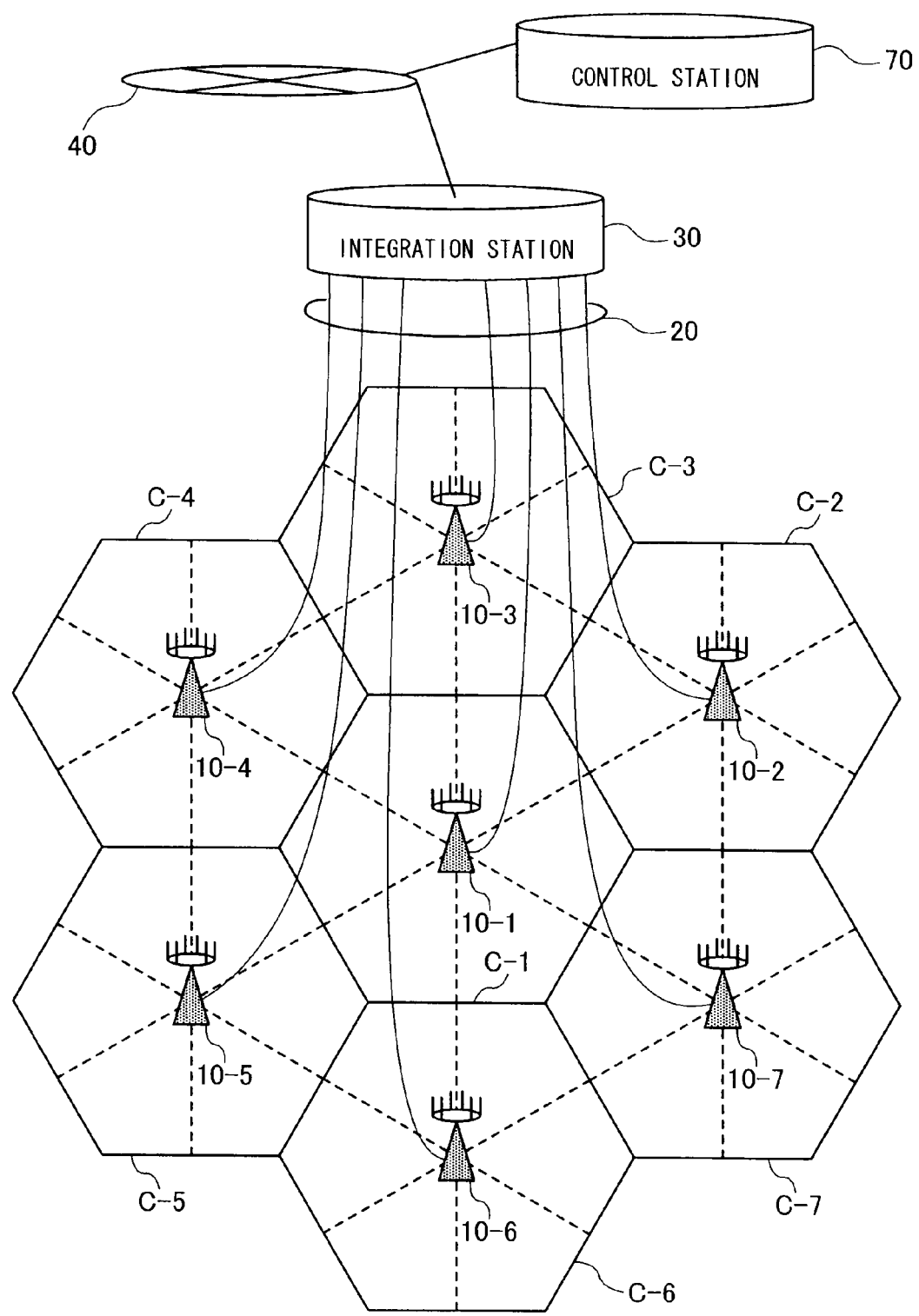
FIG. 2 is a schematic configuration diagram of a radio communication system according to Embodiment 1 of the present invention.

FIG. 2 is a schematic configuration diagram of a radio communication system according to the present embodiment. The radio communication system of the present embodiment is composed of a plurality of radio base stations 10 (10-1 to 10-7, . . . ), a centralized station 30 connected to the plurality of radio base stations 10 via an optical fiber 20 and a network 40 connected to the centralized station 30. The plurality of centralized stations 30 are integrated by a control station 70. FIG. 2 shows only one cluster CL. The cluster CL is a unit in which the plurality of radio base stations 10-2 to 10-7 perform coordinated transmission. In the present embodiment, one cluster CL is composed of a center cell C-1 and a plurality of neighboring cells C-2 to C-7. The center cell C-1 is formed of the radio base station 10-1 located in the center. The plurality of neighboring cells C-2 to C-7 is formed of the plurality of the other radio base stations 10-2 to 10-7 arranged so as to surround the center radio base station 10-1 around the center cell C-1. A wide communication area is formed by two-dimensionally arranging the cluster CL which is the unit in which such a plurality of radio base stations 10-2 to 10-7 perform coordinated transmission. The present embodiment is a radio communication system that avoids inter-cluster interference in a cluster and realizes interference combining capability in the cluster.

Figure 3A:
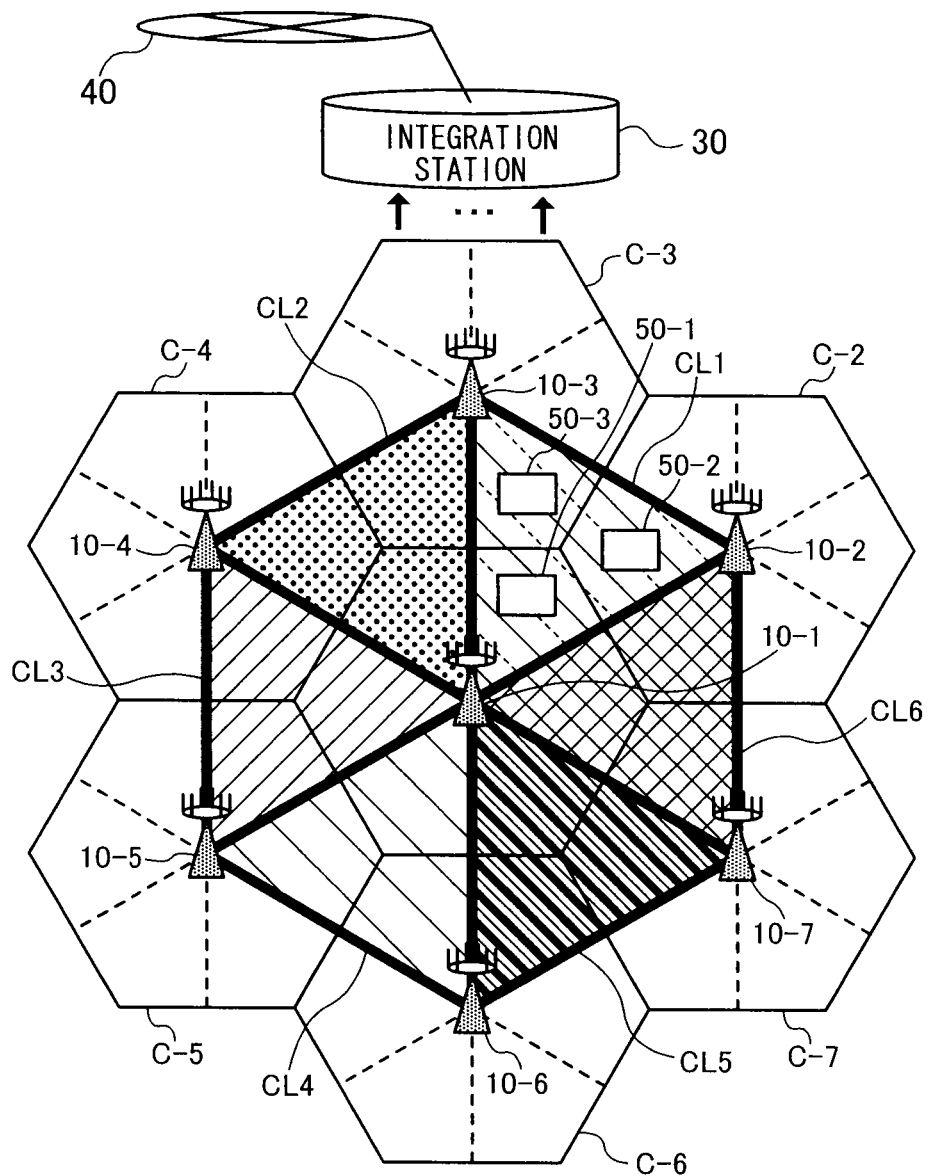
FIG. 3A is a diagram illustrating a coordinated cluster formed of the radio communication system according to Embodiment 1.
Figure 3B:
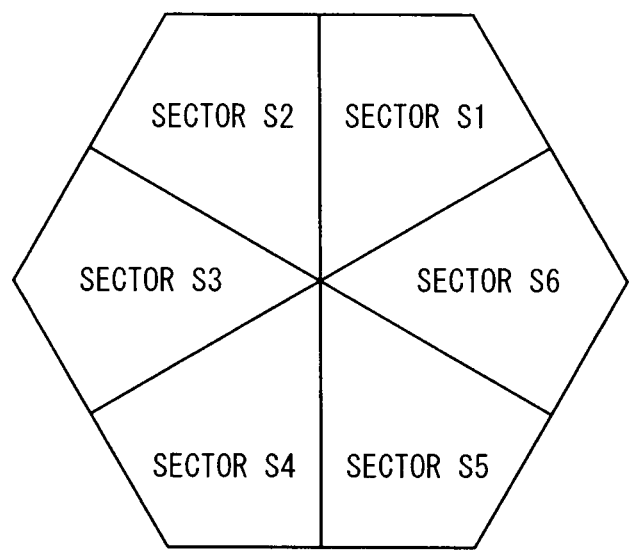
FIG. 3B is a diagram illustrating a coordinated cluster formed of the radio communication system according to Embodiment 1.

FIG. 3A shows a situation in which only one cluster is extracted from the radio communication system according to the present embodiment and conceptually shows a partial coordinated area formed in the cluster. FIG. 3B is a diagram illustrating a sector configuration of one cell and one cell is composed of six sectors S1 to S6, but the sector configuration is not limited to six sectors.

As shown in FIG. 3A, in the radio communication system according to the present embodiment, one cluster is formed of seven radio base stations 10-1 to 10-7. Three neighboring radio base stations form one coordinated area. To be more specific, three neighboring radio base stations (10-1, 10-2, 10-3) forma coordinated area CL1 and three neighboring radio base stations (10-1, 10-3, 10-4) form a coordinated area CL2. Likewise, three neighboring radio base stations (10-1, 10-4, 10-5), (10-1, 10-5, 10-6), (10-1, 10-6, 10-7) and (10-1, 10-7, 10-2) form coordinated areas CL3, CL4, CL5 and CL6 respectively. In the example shown in FIG. 3A, three radio terminals 50-1, 50-2 and 50-3 are present in the cluster, the radio terminal 50-1 is under the control of the radio base station 10-1, the radio terminal 50-2 is under the control of the radio base station 10-2 and the radio terminal 50-3 is under the control of the radio base station 10-3.

A directional pattern in which directional beams are transmitted in mutually facing directions toward the coordinated area CL in the same frequency block is assigned to a set of three neighboring radio base stations forming each of the coordinated areas CL1 to CL6.

Figure 4A:
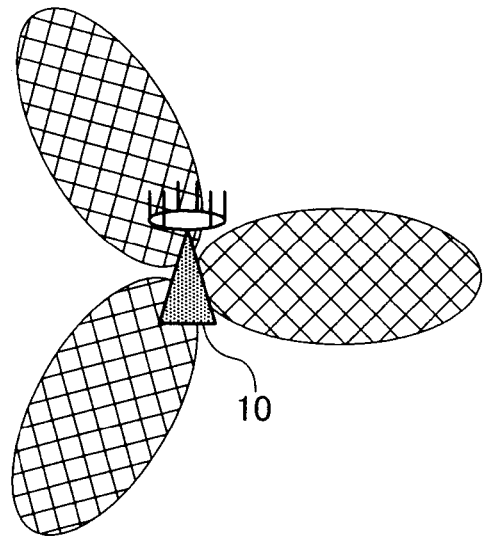
FIG. 4A is a diagram illustrating a directional pattern according to Embodiment 1.
Figure 4B:
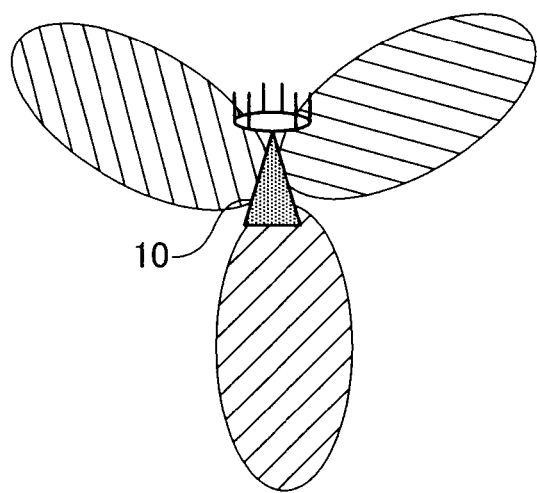
FIG. 4B is a diagram illustrating a directional pattern according to Embodiment 1.

FIGS. 4A and 4B are diagrams illustrating examples of directional pattern applied to the radio base station 10. Directional pattern as shown in FIG. 4A is composed of three directional beams having peaks in directions of 30°, 150° and 270° counterclockwise with reference to the vertical direction. Directional pattern b shown in FIG. 4B is composed of three directional beams having peaks in directions of 30°, 150° and 270° clockwise with reference to the vertical direction. Directional pattern 1 which will be described later is configured by a combination of directional patterns b and directional pattern 2 which will be described later is configured by a combination of directional patterns a.

Figure 5:
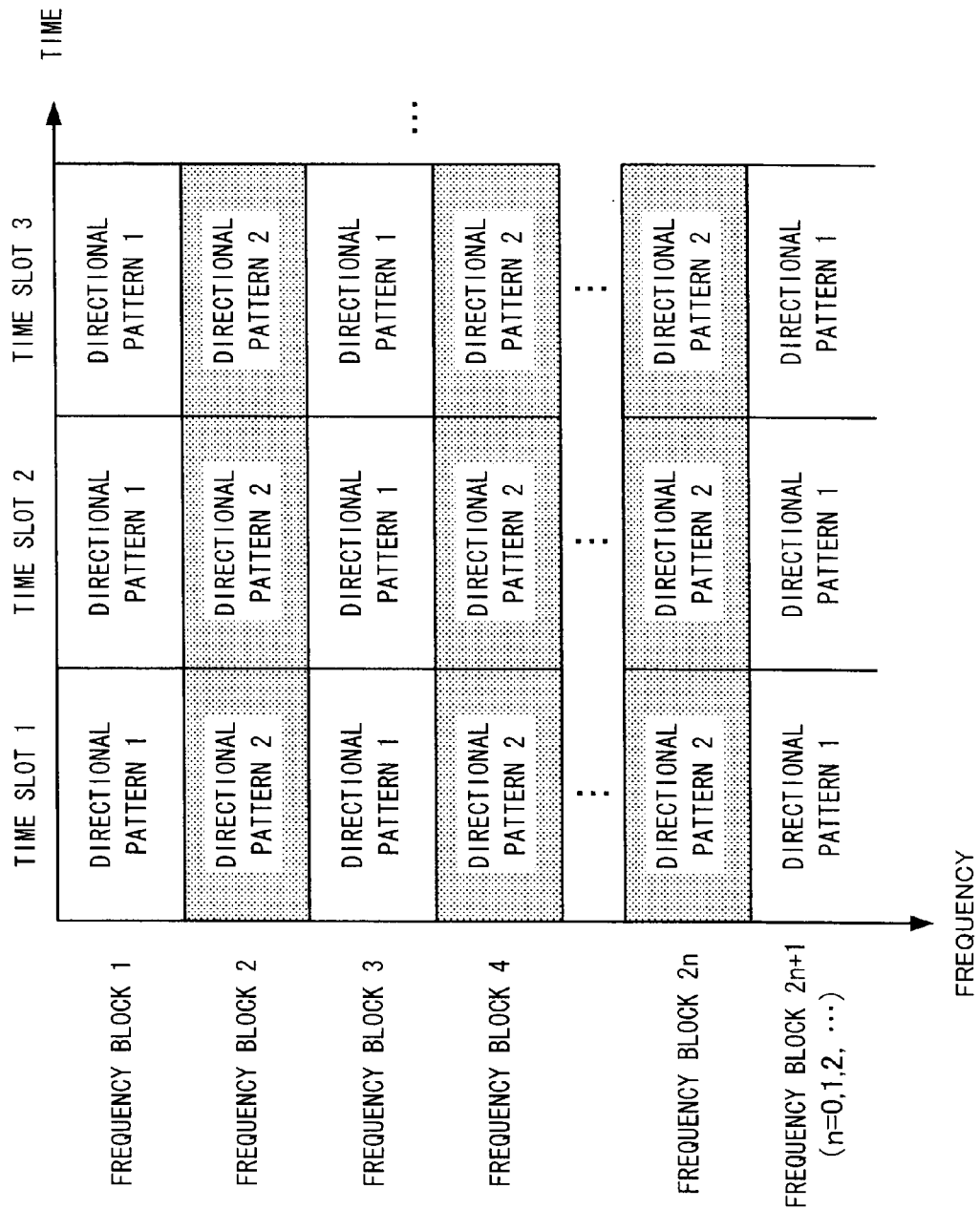
FIG. 5 is a diagram illustrating directional pattern selection information according to Embodiment 1.

FIG. 5 is a diagram illustrating a relationship between directional patterns 1 and 2, and frequency blocks. The system band of the radio communication system is divided into a plurality of frequency block 1 to frequency block $2n+1$, directional patterns 1 are assigned to odd-numbered frequency blocks and directional patterns 2 are assigned to even-numbered frequency blocks. In the assignment example shown in FIG. 5, the correspondence between directional patterns 1 and 2, and frequency blocks in the time axis direction is fixed, but the correspondence between directional patterns 1 and 2, and frequency blocks may be changed in time slot units.

Figure 6B:
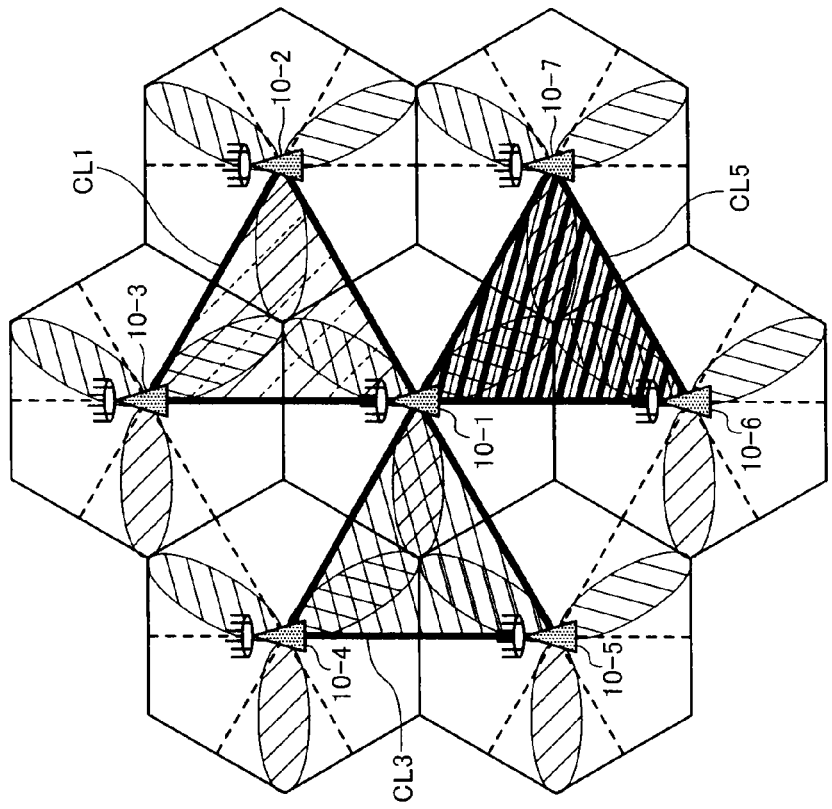
FIG. 6B is a diagram illustrating directional pattern assignment of odd-numbered frequency blocks in Embodiment 1.
Figure 6A:
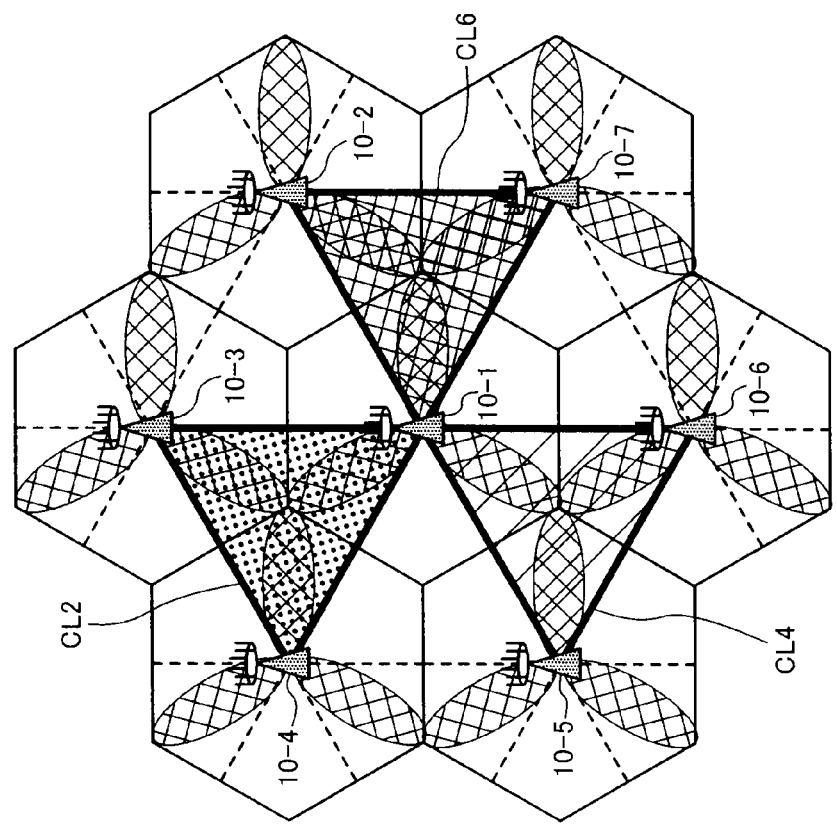
FIG. 6A is a diagram illustrating directional pattern assignment of even-numbered frequency blocks in Embodiment 1.

As shown in FIGS. 6A and 6B, a predetermined coordinated area CL is formed for each frequency block by assigning identical directional pattern 1 or 2 to all the radio base stations 10-1 to 10-7 making up one cluster in the same frequency block. In the example shown in FIG. 6A, in the case of even-numbered frequency blocks, coordinated areas CL2, CL4 and CL6 are formed in one cluster. In the example shown in FIG. 6B, in the case of odd-numbered frequency blocks, coordinated areas CL1, CL3 and CL5 are formed in one cluster. Through multiplexing in the frequency direction, coordinated areas CL1 to CL6 are formed in one cluster as shown in FIG. 3A.

Here, a relationship between a cluster pattern and inter-cluster interference will be considered.

Figure 7:
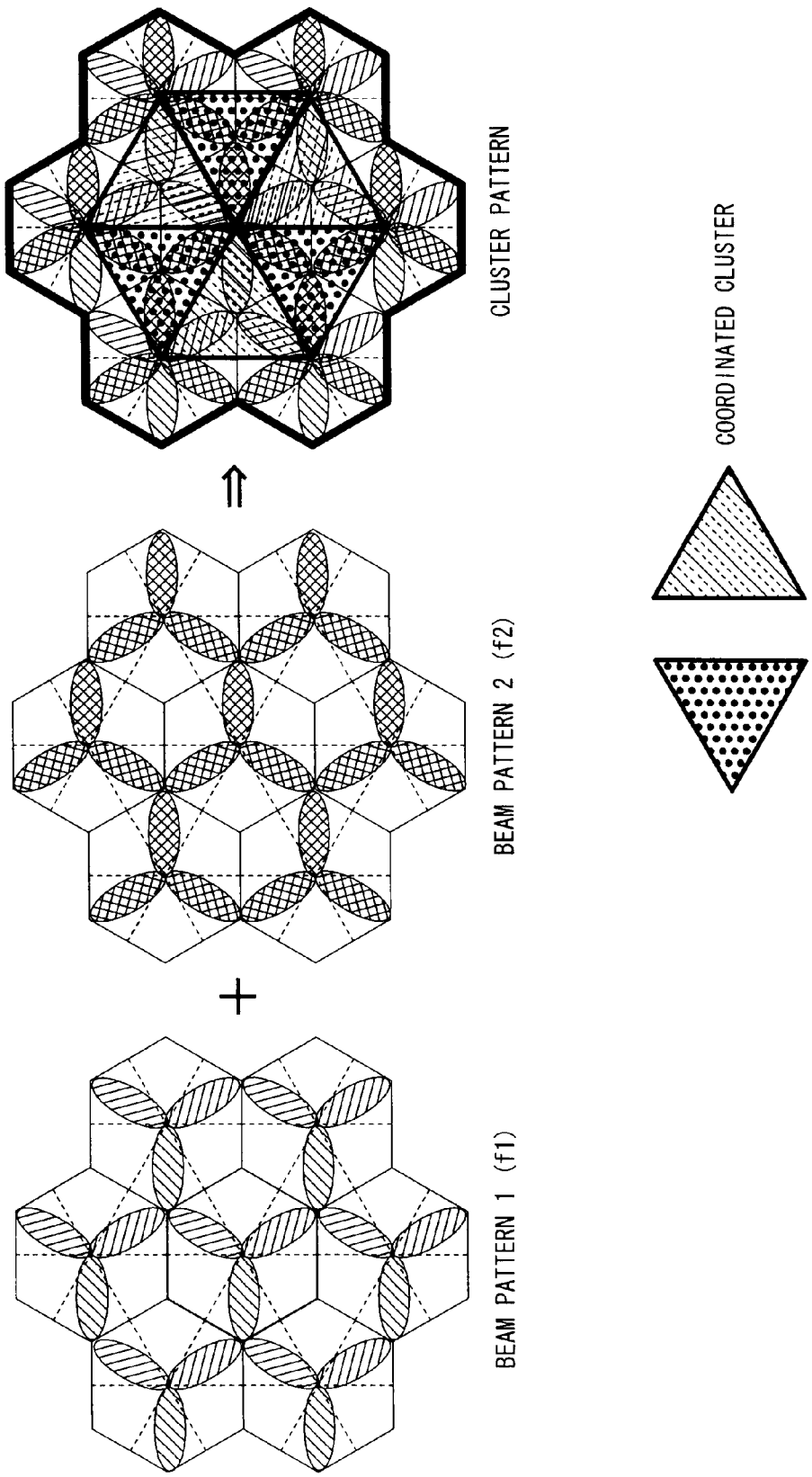
FIG. 7 is a pattern configuration diagram for illustrating a cluster pattern configuration.

As shown in FIG. 7, one cluster pattern is configured by assigning directional pattern 1 to all the radio base stations 10-1 to 10-7 in frequency block (f1) and assigning directional pattern 2 to all the radio base stations 10-1 to 10-7 in another frequency block (f2). As described above, the coordinated areas CL1 to CL6 are formed in the cluster to which a cluster pattern is applied and it is possible to orthogonalize the space in the coordinated cluster CL using a precoding method for multiuser MIMO transmission. Directional patterns 1 and 2 may also be called "beam patterns 1 and 2."

Figure 8:
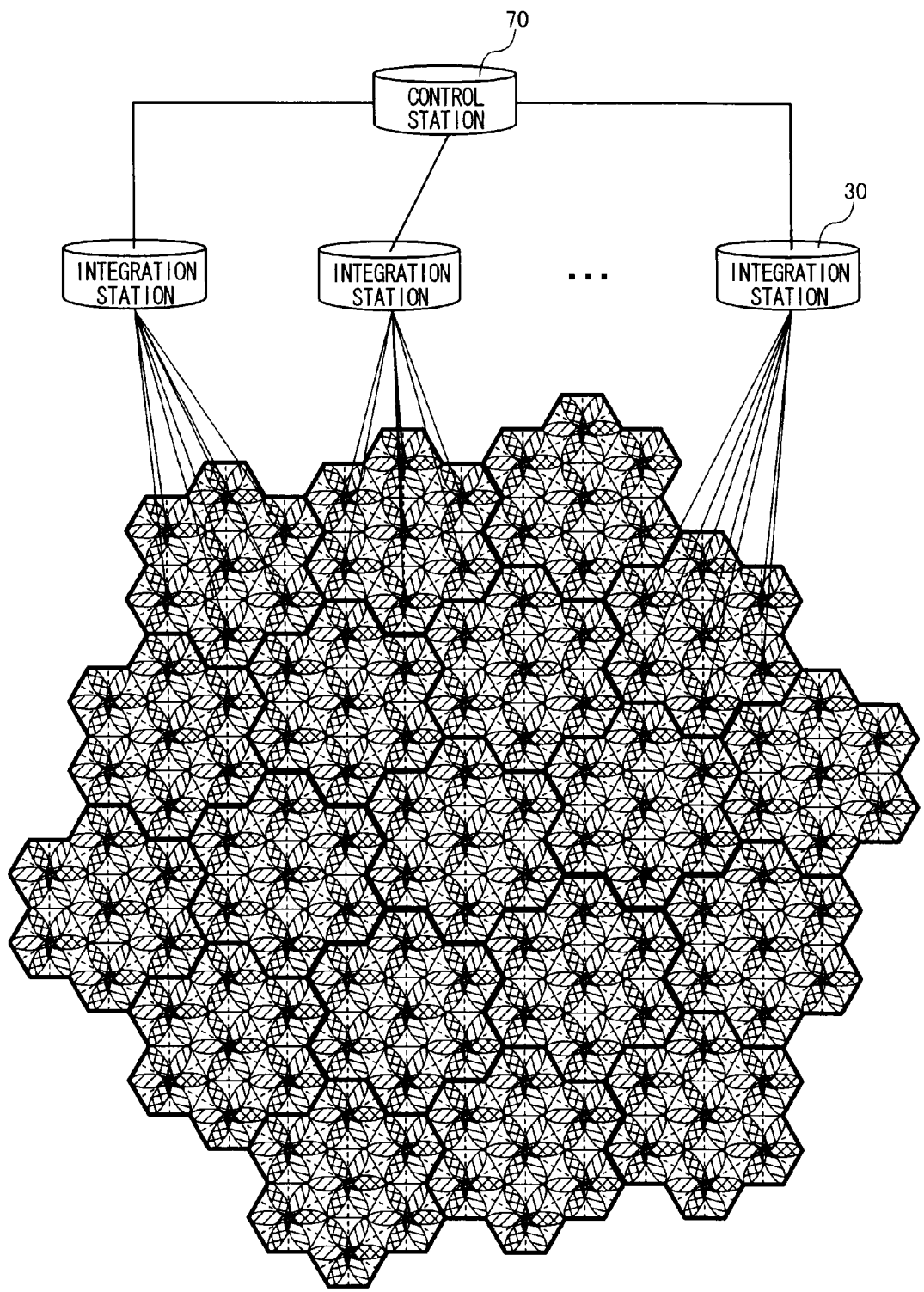
FIG. 8 is an overall configuration diagram of a radio communication system according to Embodiment 1.

FIG. 8 is a system configuration diagram of the radio communication system according to present Embodiment 1 and shows up to a control station 70 that manages centralized stations 30 arranged in cluster units. However, all clusters shown in FIG. 8 show a state in which only the same cluster pattern shown in FIG. 7 is repeatedly applied. FIG. 8 shows inter-cluster interference when only the same cluster pattern is repeatedly applied. The plurality of radio base stations 10-1 to 10-7 forming their respective clusters are connected to the same centralized station 30. The centralized station 30 applies the cluster pattern shown in FIG. 7 to the radio base stations 10-1 to 10-7 forming the cluster under the control thereof, uses a precoding method for multiuser MIMO transmission and thereby orthogonalizes the space in the coordinated cluster CL.

However, when attention is focused on between the cluster pattern units (hereinafter, simply referred to as "between clusters" or "cluster boundary") assuming one cluster pattern to be one unit, it is clear that directional beams in the same frequency block facing each other between neighboring clusters which form a cluster boundary. That is, when a single cluster pattern is assigned to all clusters, inter-cluster interference occurs on the cluster boundary.

The present inventor et al. have come up with the present invention by focusing attention on the fact that increasing the number of types of cluster patterns and causing a plurality of types of cluster patterns to coexist has an effect of avoiding inter-cluster interference.

Figure 9A:
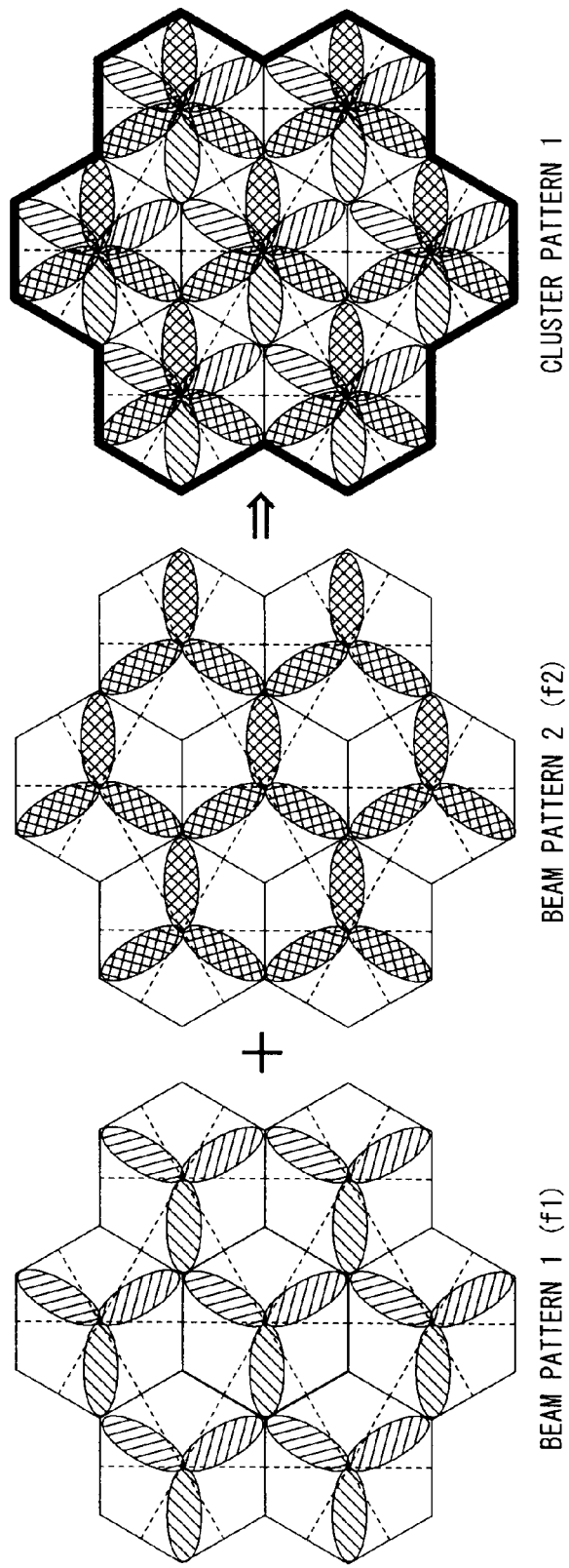
FIG. 9A is a pattern configuration diagram for illustrating the configuration of two types of cluster patterns.
Figure 9B:
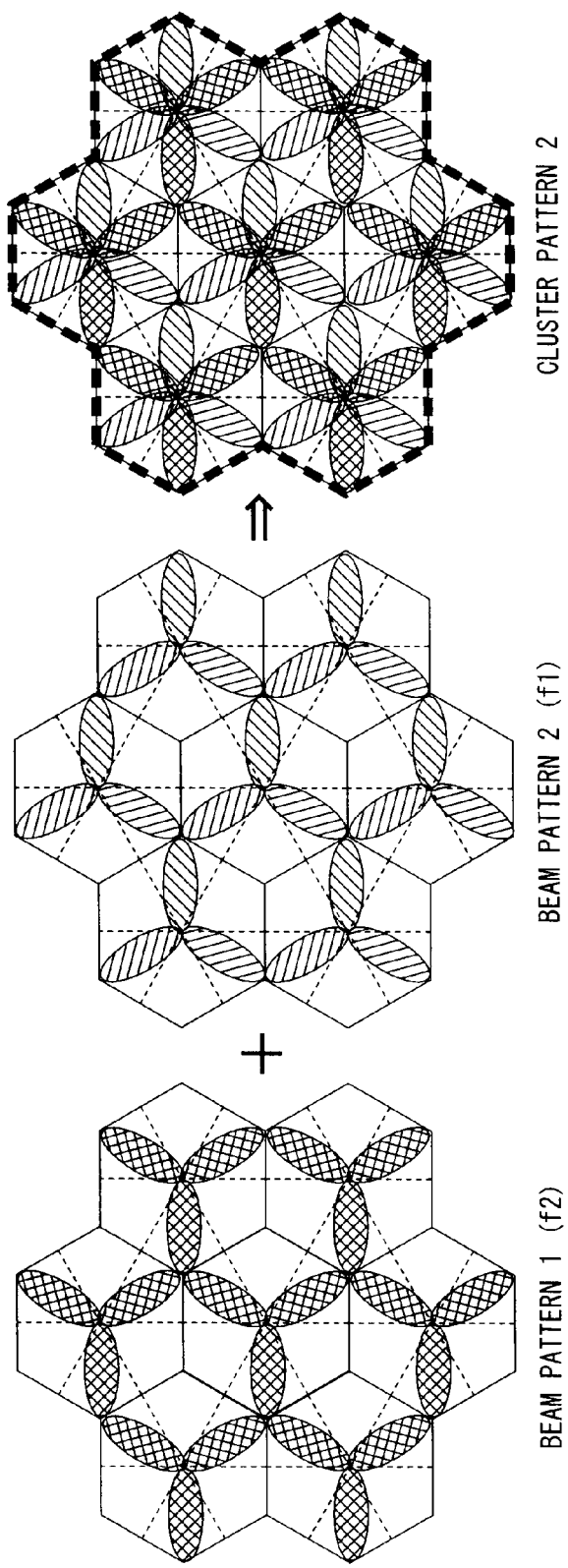
FIG. 9B is a pattern configuration diagram for illustrating the configuration of two types of cluster patterns.

FIGS. 9A and 9B show configuration examples of two types of cluster patterns.

Cluster pattern 1 is configured in the same way as in FIG. 7. That is, as shown in FIG. 9A, cluster pattern 1 is configured by assigning directional pattern 1 to all the radio base stations 10-1 to 10-7 in frequency block (f1) and assigning directional pattern 2 to all the radio base stations 10-1 to 10-7 in another frequency block (f2).

As shown in FIG. 9B, cluster pattern 2 is designed to have a combination of directional pattern and frequency opposite to that of cluster pattern 1. That is, cluster pattern 2 is configured by assigning directional pattern 1 to all the radio base stations 10-1 to 10-7 in frequency block (f2) and assigning directional pattern 2 to all the radio base stations 10-1 to 10-7 in frequency block (f1).

Figure 10:
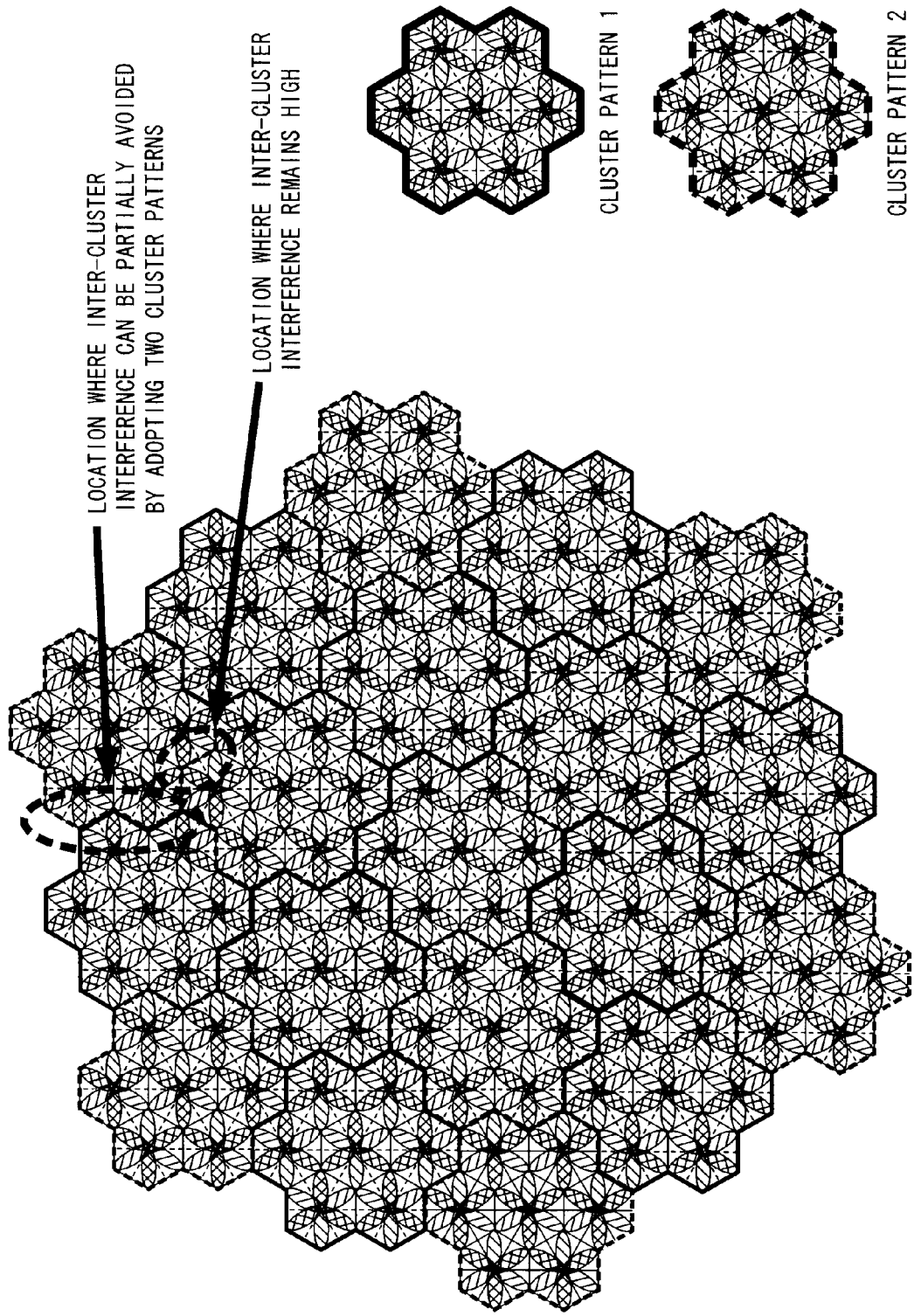
FIG. 10 is a diagram illustrating interference between clusters when two types of cluster patterns are arranged.

FIG. 10 shows an arrangement example of cluster pattern 1 and cluster pattern 2. As shown in FIG. 10, when the number of types of cluster patterns is set to two, a region is formed where three directional beams do not face each other in the same frequency block on part of the cluster boundary (only two directional beams face each other at maximum). There are still locations in part of the cluster boundary where inter-cluster interference remains high, but inter-cluster interference can be drastically avoided compared to the case where a single cluster pattern is assigned to all clusters shown in FIG. 8.

Figure 11A:
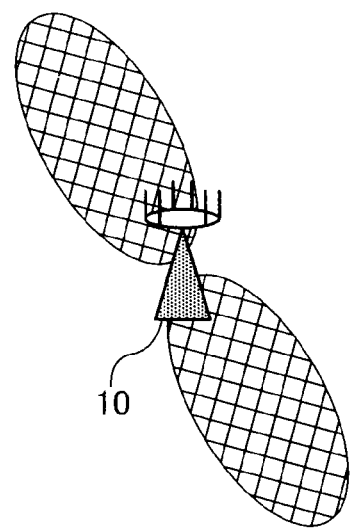
FIG. 11A is a diagram illustrating three types of directional patterns according to Embodiment 1.
Figure 11B:
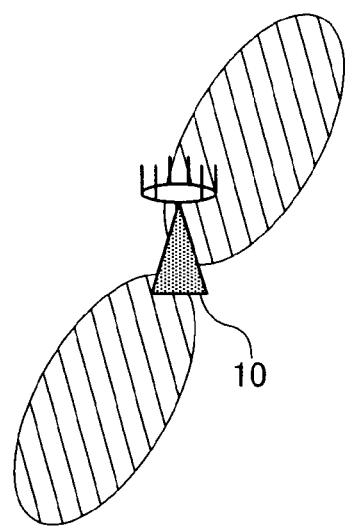
FIG. 11B is a diagram illustrating three types of directional patterns according to Embodiment 1.
Figure 11C:
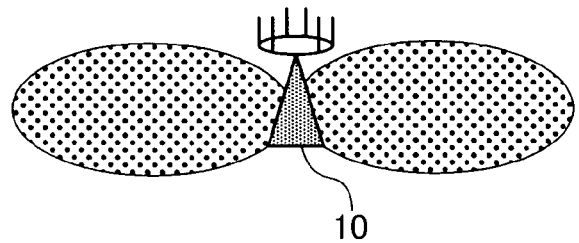
FIG. 11C is a diagram illustrating three types of directional patterns according to Embodiment 1.

Increasing the number of types of cluster patterns is considered to further increase the effect of avoiding inter-cluster interference. One possible method of increasing the number of types of cluster patterns is increasing the number of types of directional patterns. As shown in FIGS. 11A, 11B and 11C, three types of directional patterns α, β and γ can be used. Directional pattern 11 shown in FIG. 11A is composed of directional beams having peaks in two directions of 45° and 225° counterclockwise with reference to the vertical direction. Directional pattern 12 shown in FIG. 11B is composed of directional beams having peaks in two directions of 45° and 225° clockwise with reference to the vertical direction. Directional pattern 13 shown in FIG. 11C is composed of directional beams having peaks in two directions of 90° and 270° clockwise with reference to the vertical direction. Directional pattern 11 which will be described later is configured by a combination of directional patterns α, β and γ. Similarly, directional patterns 12 and 13 which will be described later are also configured by a combination of directional patterns α, β and γ.

Figure 12:
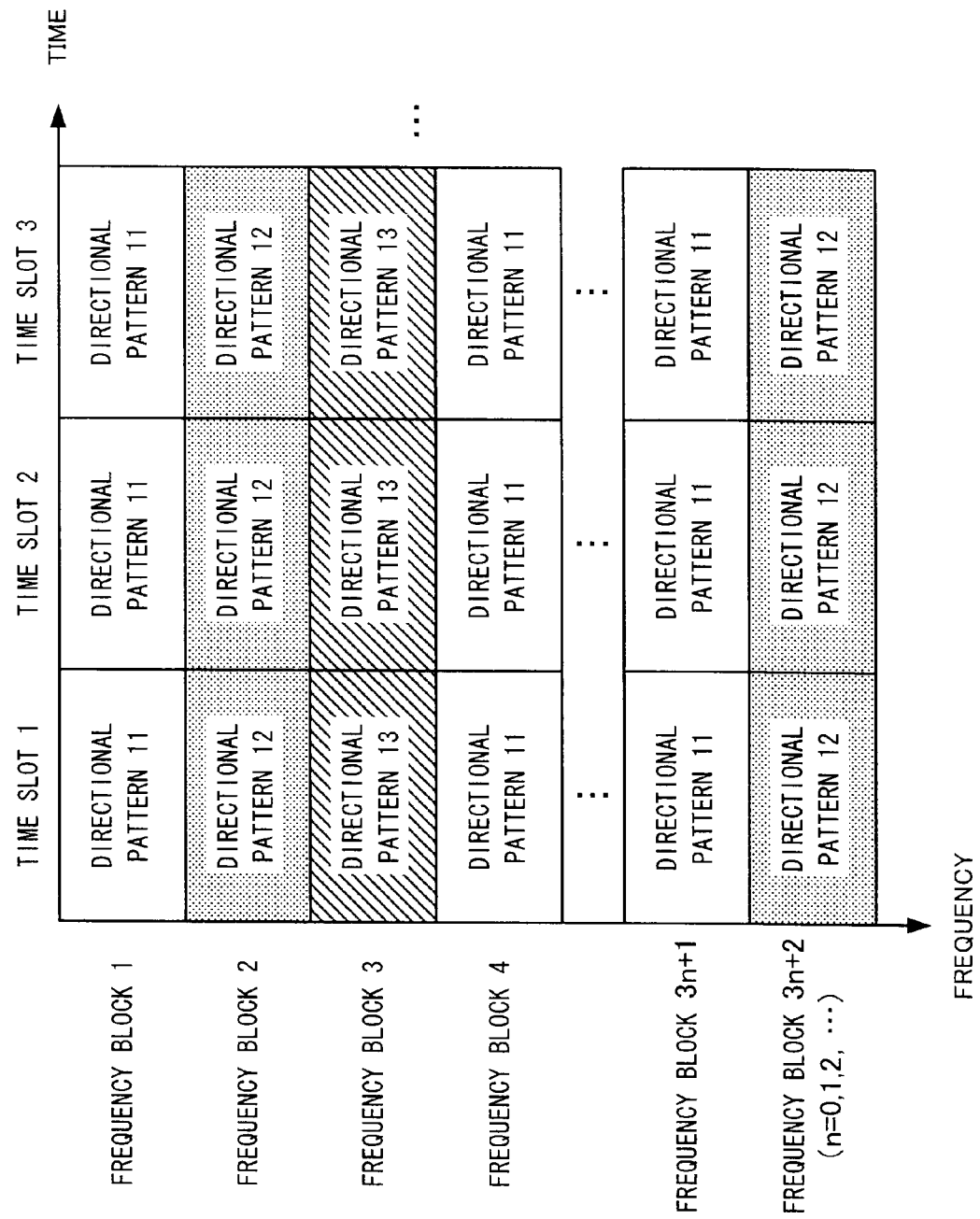
FIG. 12 is a diagram illustrating directional pattern selection information corresponding to three types of directional patterns according to Embodiment 1.

FIG. 12 is a diagram illustrating a relationship between directional patterns 11, 12 and 13, and frequency blocks. The system band of the radio communication system is divided into a plurality of frequency blocks, directional pattern 11 is assigned to frequency block $3n+1$ (n=0, 1, 2, ...), directional pattern 12 is assigned to frequency block $3n+2$ (n=0, 1, 2, ...) and directional pattern 13 is assigned to frequency block $3n+3$ (n=0, 1, 2, ...). In the example shown in FIG. 12, the correspondence between directional patterns 11, 12 and 13, and frequency blocks in the time axis direction is fixed, but the correspondence between directional patterns 11, 12 and 13, and frequency blocks may be changed in time slot units.

Figure 13:
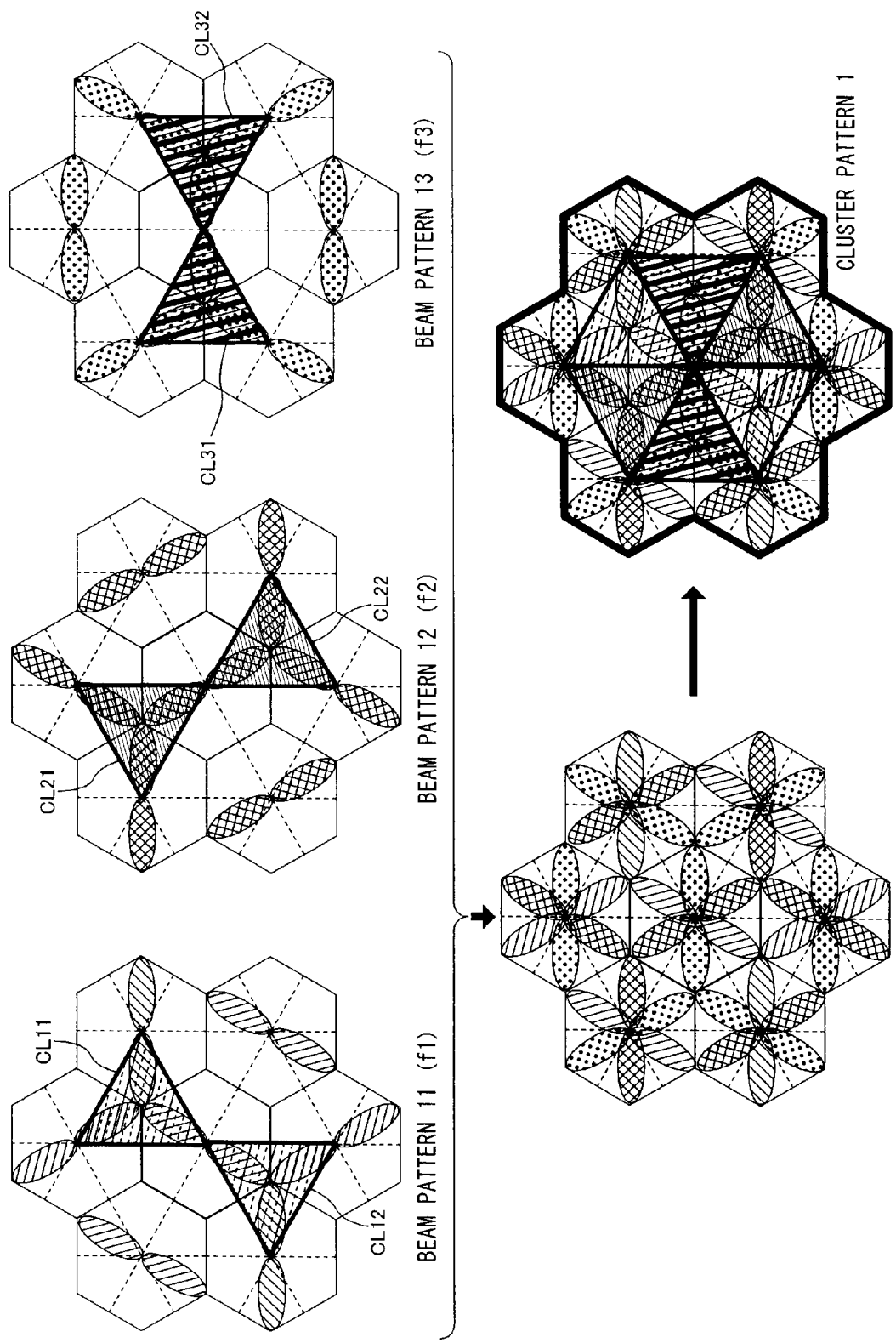
FIG. 13 is a diagram illustrating a cluster pattern configuration example using three types of patterns according to Embodiment 1.

FIG. 13 shows an example where one cluster pattern is configured by combining three types of frequency blocks (f1, f2, f3) and three types of directional patterns 11, 12 and 13. Coordinated areas CL11 and CL12 are formed in directional pattern 11 in frequency block f1, coordinated areas CL21 and CL22 are formed in directional pattern 12 in frequency block f2, and coordinated areas CL31 and CL32 are formed in directional pattern 13 in frequency block f3. Cluster pattern 1 is configured by combining these three directional patterns 11, 12 and 13. The cluster to which cluster pattern 1 is applied contains six coordinated areas CL11 to CL32. Directional patterns 11, 12 and 13 may also be called "beam patterns 11, 12 and 13" respectively.

Figure 14:
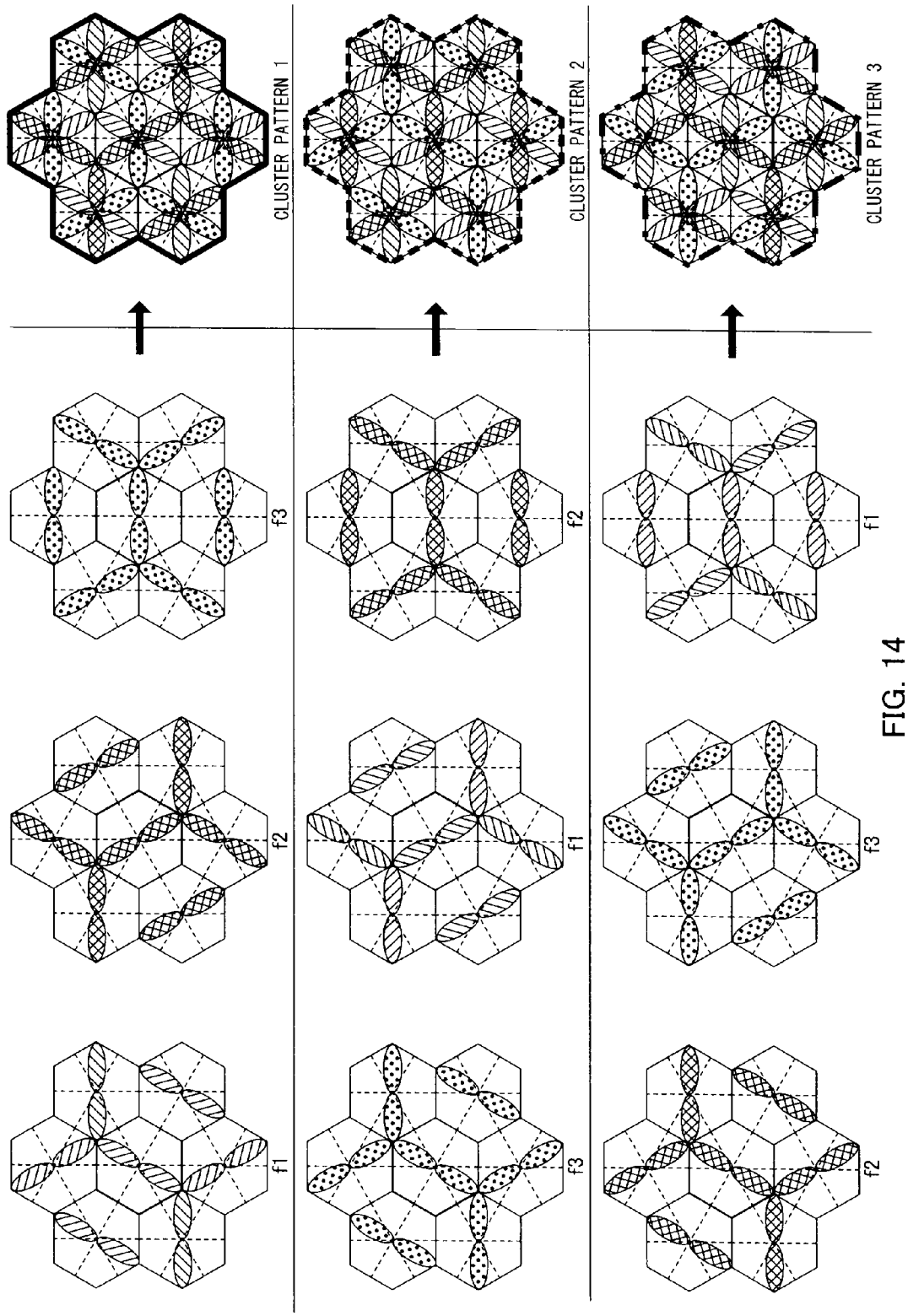
FIG. 14 is a pattern configuration diagram for illustrating the configuration of three types of cluster patterns.

FIG. 14 shows three types of cluster patterns 1, 2 and 3 that can be configured by combining directional patterns 11, 12 and 13, and frequency blocks f1, f2 and f3. Cluster pattern 1 is the same as that shown in FIG. 13. Cluster pattern 2 is configured by assigning directional pattern 11 to frequency block f3, assigning directional pattern 12 to frequency block f1 and assigning directional pattern 13 to frequency block f2. Cluster pattern 3 is configured by assigning directional pattern 11 to frequency block f2, assigning directional pattern 12 to frequency block f3 and assigning directional pattern 13 to frequency block f1.

Figure 15:
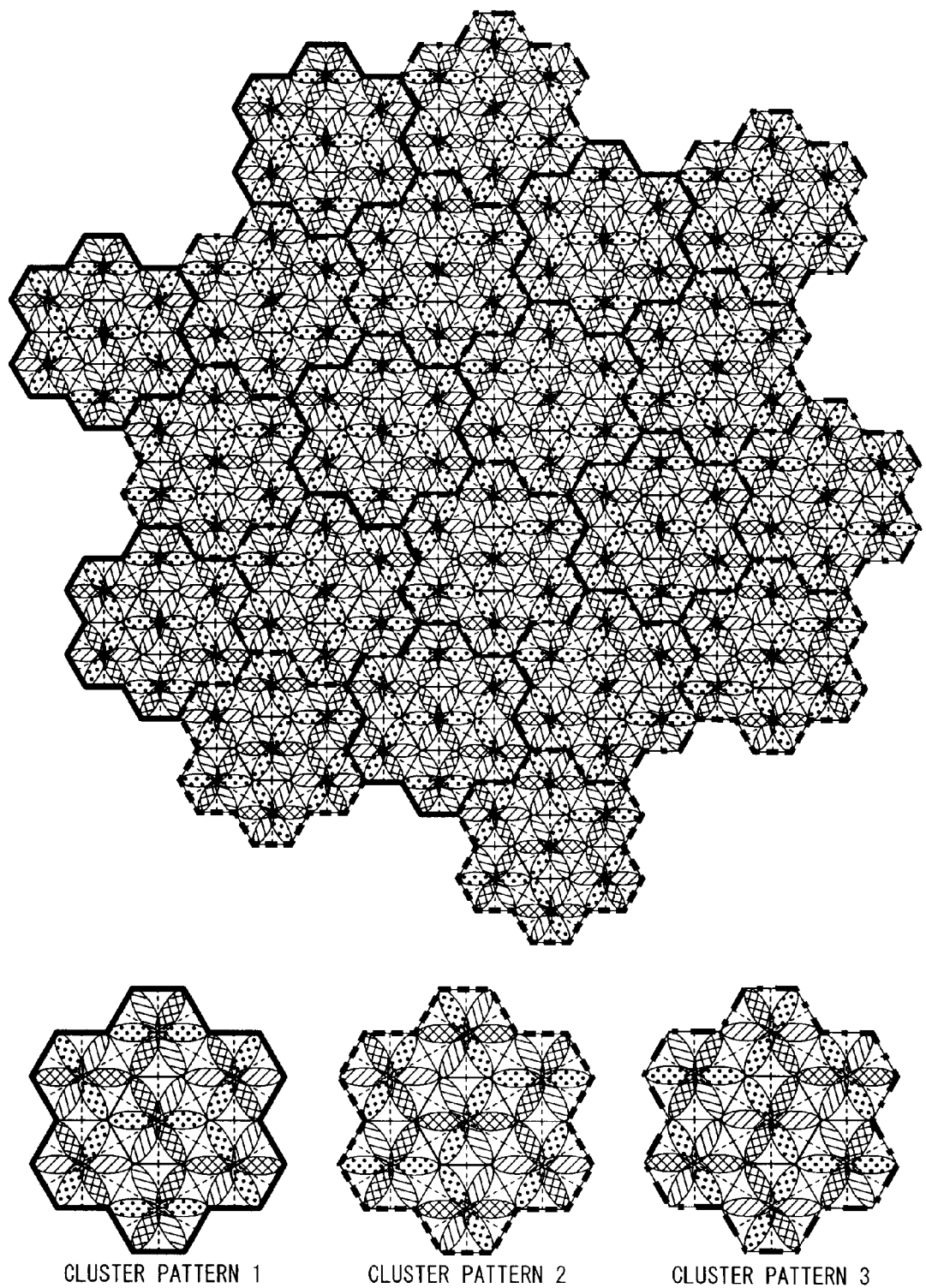
FIG. 15 is a diagram illustrating inter-cluster interference when three types of cluster patterns are arranged.
Figure 16:
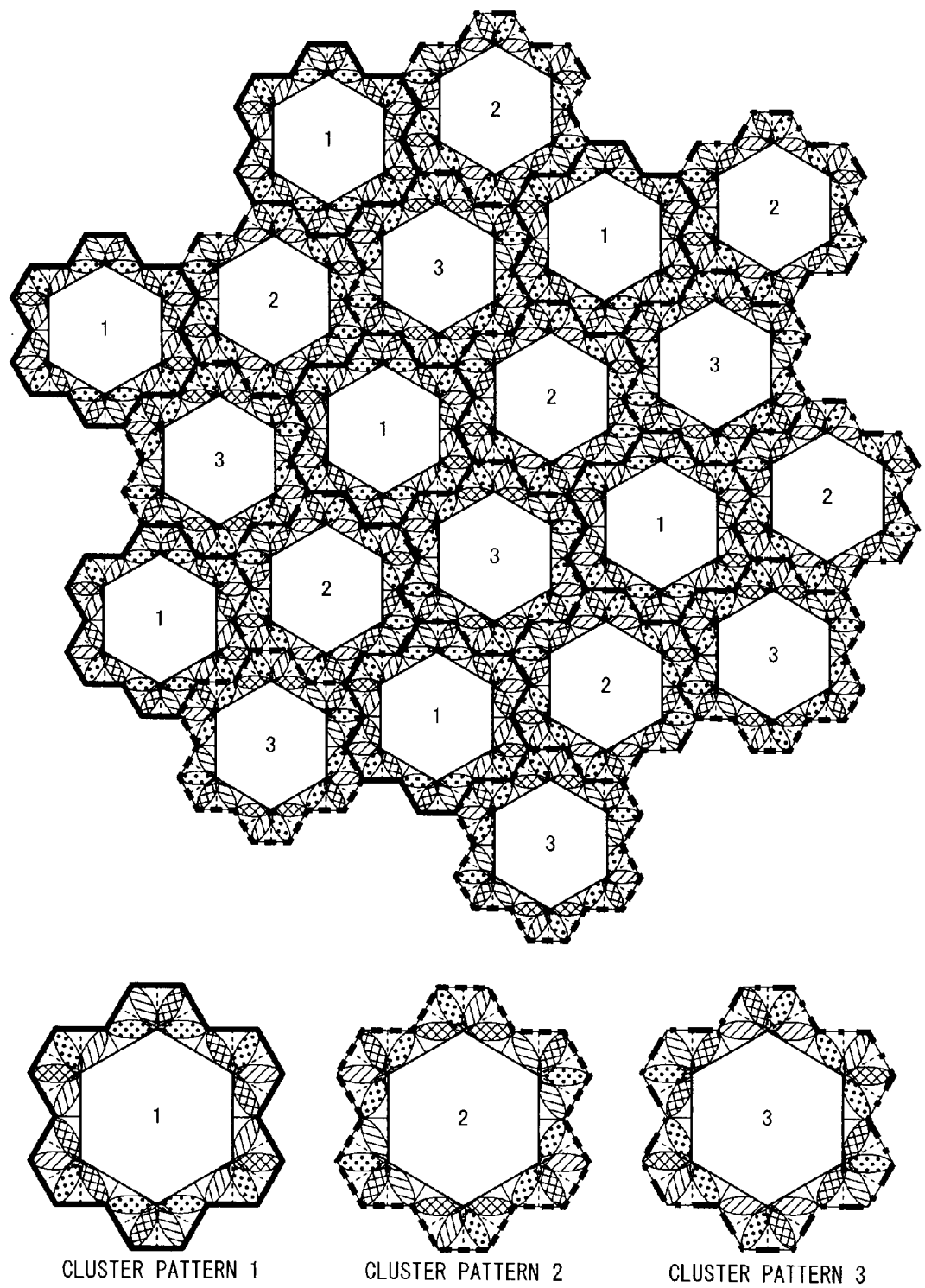
FIG. 16 is a diagram illustrating inter-cluster interference when three types of cluster patterns are arranged.

FIGS. 15 and 16 show cases where three types of cluster patterns 1, 2 and 3 shown in FIG. 14 are fixedly assigned to a communication area. As shown in FIGS. 15 and 16, by arranging three types of cluster patterns 1, 2 and 3 in a substantially uniformly distributed manner, the number of locations where directional beams face each other and interfere with each other at the same frequency is further reduced on cluster boundaries. That is, it is possible to confirm that the inter-cluster interference avoidance effect is improved by increasing the number of types of cluster patterns. FIG. 16 shows an assignment state similar to that of FIG. 15 and describes the assignment state of cluster patterns 1, 2 and 3 more clearly.

Figure 17A:
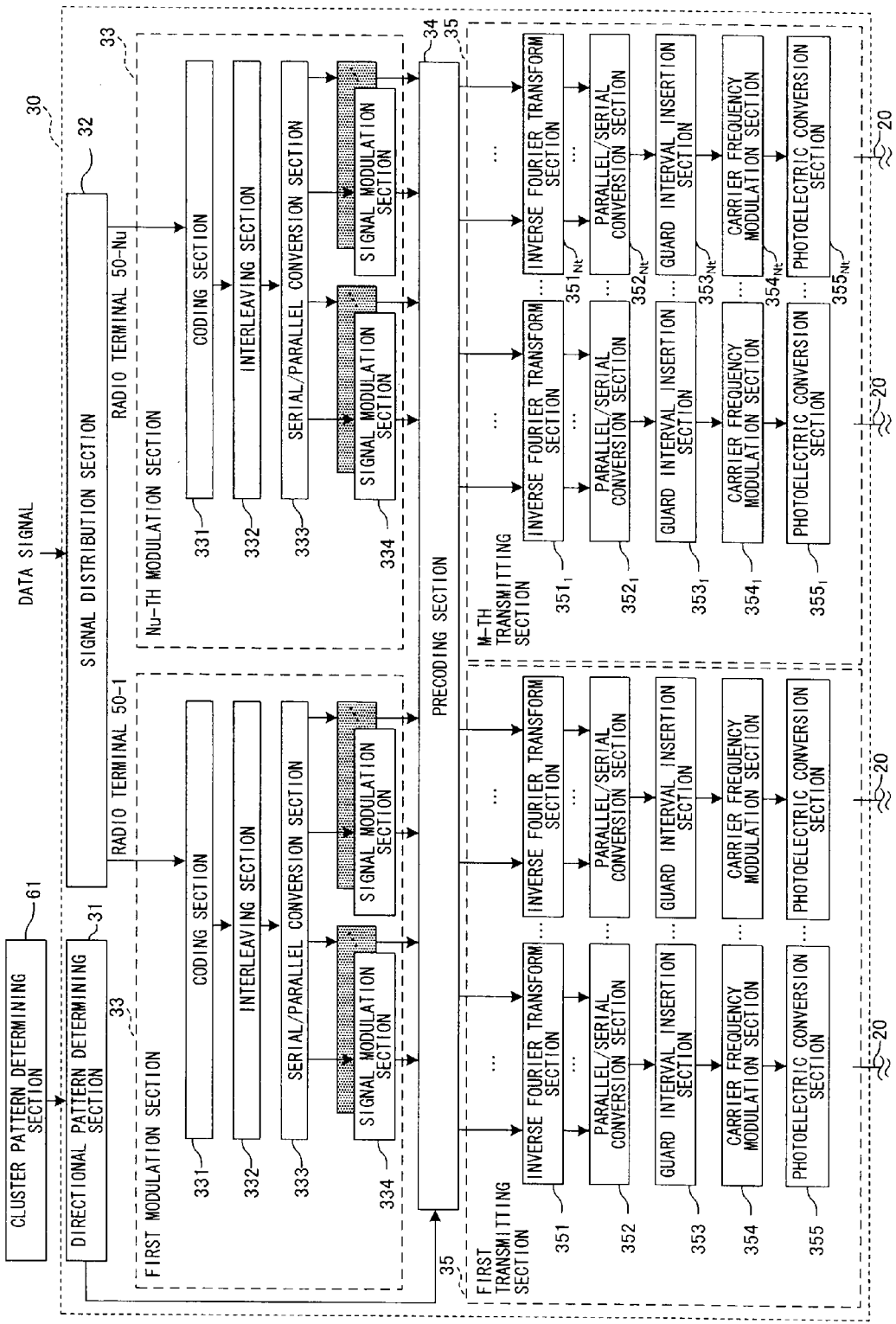
FIG. 17A is a schematic function block diagram of the centralized station according to Embodiment 1 of the present invention.
Figure 17B:
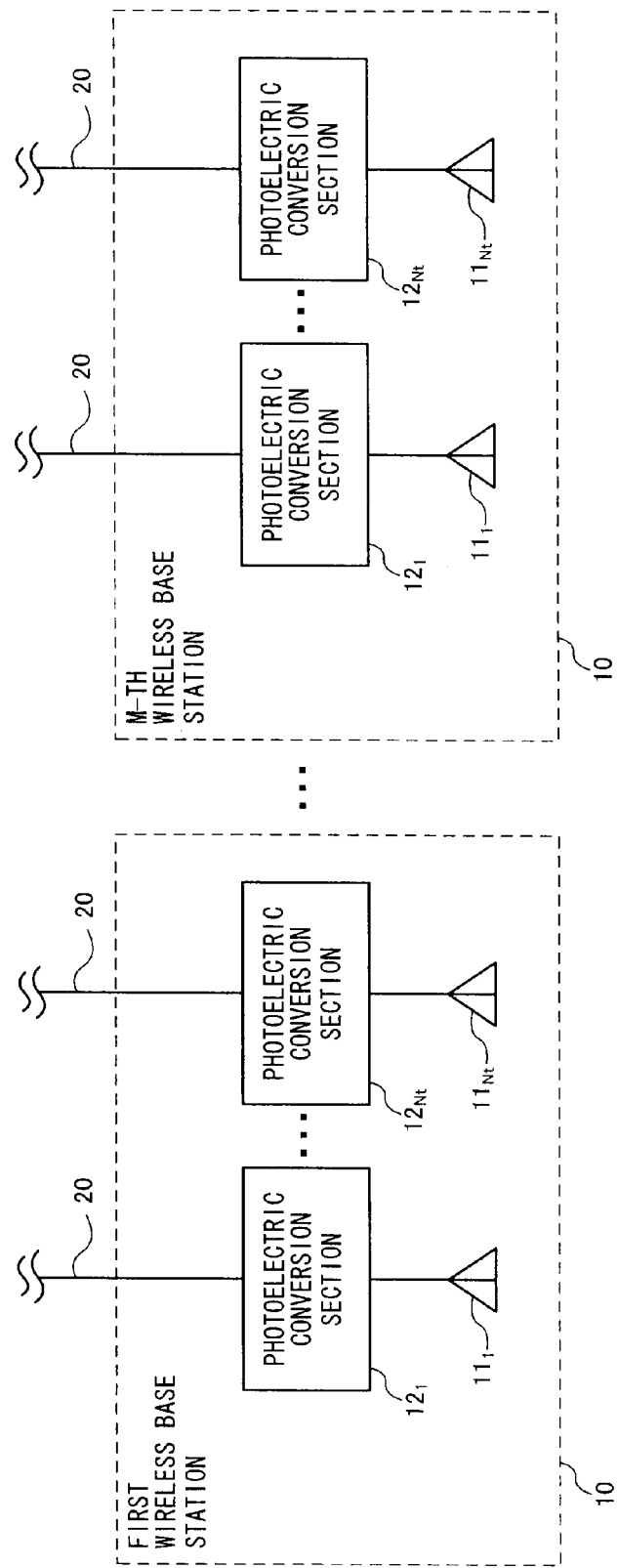
FIG. 17B is a schematic function block diagram of the radio base station according to Embodiment 1 of the present invention.

Next, the function configuration of the centralized station 30 and each radio base station 10 making up the radio communication system according to the present embodiment will be described. FIGS. 17A and 17B are function block diagrams of the centralized station 30 and each radio base station 10 (first radio base station apparatus to M-th radio base station apparatus). The present embodiment assumes the number of radio base stations 10 to be M, the number of antenna elements 11 of each radio base station 10 to be Nt and the number of radio terminals 50 to be Nu. The overall system configuration of the radio communication system according to the present embodiment is as shown in FIG. 8, and the centralized stations 30 integrate a plurality of radio base stations 10-1 to 10-7 making up each cluster and the control station 70 manages these centralized stations 30.

A cluster pattern determining section 61 determines a cluster pattern to be applied to the plurality of radio base stations 10-1 to 10-7 connected to the centralized station 30 from among a plurality of types (e.g., three types shown in FIG. 14 and FIG. 15). In this case, the present embodiment determines cluster patterns 1, 2 and 3 to be applied to the radio base stations 10-1 to 10-7 under the control of each centralized station in cluster units (centralized station units) so that the three types of cluster patterns 1, 2 and 3 are substantially uniformly arranged as shown in FIG. 15. Thus, the cluster pattern determining section 61 is preferably arranged in the control station 70 that manages many centralized stations 30 as shown in FIG. 8. The control station 70 determines the arrangement (assignment) of cluster patterns 1, 2 and 3 that can reduce inter-cluster interference to a minimum or a desired value or below based on channel conditions of target mobile terminals or the like notified from many centralized stations 30. Each centralized station 30 is notified of the cluster pattern (1, 2 or 3) determined in cluster units via notifying means. Alternatively, the centralized station 30 may individually include the cluster pattern determining section 61 and the centralized stations 30 may exchange applicable cluster pattern information and determine so as to prevent the same cluster pattern from being applied between neighboring clusters or within a predetermined area. Alternatively, the cluster pattern determining section 61 provided for one centralized station 30 may determine an overall cluster pattern arrangement including other clusters and notify the other centralized stations 30 of the determined cluster pattern.

The centralized station 30 assigns directional patterns to the radio base stations 10-1 to 10-7 based on the cluster pattern determined by the cluster pattern determining section 61. The centralized station 30 is provided with a directional pattern determining section 31, a signal distribution section 32, Nu modulation sections (first modulation section to Nu-th modulation section) 33 corresponding in number to the radio terminals that perform transmission at the same transmission timing, a precoding section 34 and M transmitting sections (first transmitting section to M-th transmitting section) 35 corresponding in number to the radio base stations.

The directional pattern determining section 31 receives an indication of the cluster pattern type determined by the cluster pattern determining section 61. Suppose the directional pattern determining section 31 has received an indication, for example, of cluster pattern 1 shown in FIG. 14. The directional pattern determining section 31 determines a combination of a frequency block and a directional pattern for each slot time for the plurality of radio base stations 10-1 to 10-7 under the control thereof based on cluster pattern 1 and indicates the combination to the precoding section 34. For example, at a timing of time slot 1 shown in FIG. 12, directional pattern 11 is assigned in frequency block $3n+1$, directional pattern 12 is assigned in frequency block $3n+2$ and directional pattern 13 is assigned in frequency block $3n+3$, and as a result, cluster pattern 1 is assigned to the radio base stations 10-1 to 10-7 in time slot 1.

As shown in FIG. 15, in another cluster adjacent to the cluster to which cluster pattern 1 is applied, cluster pattern 2 is likewise assigned to the plurality of radio base stations 10 making up the other cluster and cluster pattern 3 is assigned in a further cluster adjacent to the other cluster.

Thus, the cluster pattern determining section 61 determines a cluster pattern for each cluster so that a plurality of types of cluster patterns 1, 2 and 3 are mixed and arranged in a distributed manner, and upon receiving the determined cluster pattern, the directional pattern determining section 31 determines a directional pattern for each frequency block for each radio base station 10 under the control thereof.

As shown in FIG. 15, cluster patterns 1, 2 and 3 may be fixedly assigned to each cluster. In this case, the cluster pattern determining section 61 determines a cluster pattern to be assigned to each cluster at the time of system construction or at the time of system update when the cluster configuration is changed, and notifies the directional pattern determining section 31 of the centralized station 30 of the determined cluster pattern.

The signal distribution section 32 receives data signals for all the radio terminals 50-1 to 50-Nu connected to all the radio base stations 10 under the control of the centralized station 30 from the network 40 and distributes the data signals received from the network 40 to the radio terminals 50-1 to 50-Nu. The signal distribution section 32 inputs the data signals distributed to the Nu radio terminals to the first modulation section 33 to Nu-th modulation section 33 respectively.

The modulation section 33 is provided with a coding section 331, an interleaving section 332, a serial/parallel conversion section 333 and signal modulation sections 334 corresponding in number to the number of subcarriers L and the number of transmission streams Nr (that is, L (number of subcarriers)×Nr (number of transmission streams) signal modulation sections 334).

The coding section 331 performs coding on the data signal inputted from the signal distribution section 32 using a predetermined coding method. Here, a turbo code, convolutional code or LDPC code may be used as the coding method, and the present invention can be implemented regardless of the coding method. The coding section 331 inputs the coded data signal to the interleaving section 332.

The interleaving section 332 performs interleaving on the data signal inputted from the coding section 331. Here, any method can be used as the interleaving method and the present invention can be implemented regardless of the interleaving method. The interleaving section 332 inputs the interleaved data signal to the serial/parallel conversion section 333.

The serial/parallel conversion section 333 converts a sequence of data signals inputted from the interleaving section 332 to parallel data signals corresponding in number to the number of subcarriers L and the number of transmission streams Nr. The serial/parallel conversion section 333 inputs the data signals corresponding in number to the number of subcarriers L and the number of transmission streams Nr to the signal modulation sections 334 provided so as to correspond in number to the number of subcarriers L and the number of transmission streams Nr.

Each signal modulation section 334 performs M-ary modulation on the data signals inputted from the serial/parallel conversion section 333. Here, the M-ary modulation value may be fixed or may be adaptively changed according to the channel situation. Each signal modulation section 334 inputs the data signal subjected to M-ary modulation to the precoding section 34.

The precoding section 34 performs precoding on the data signal inputted from each of the signal modulation sections 334 of the Nu modulation sections 33 corresponding in number to the radio terminals. The precoding section 34 selects simultaneous precoding on a plurality of cells using clusters that can be coordinated (sector whose beam faces a sector of a neighboring cell at the same frequency) through multiuser MIMO (BD-ZF, ZF or the like)/Coordinated Beamforming (CB) based on the directional pattern information inputted from the directional pattern determining section 31.

The precoding section 34 multiplies the inputted data signal by a selected precoding transmission weight and generates data signals corresponding to the total number of antenna elements Nt of the M radio base stations 10 under the control of the centralized station 30 (that is, data signals corresponding to the number of radio base stations M×the number of antenna elements Nt of each radio base station 10). The M×Nt data signals generated by the precoding section 34 are inputted to a first transmitting section 35 to an M-th transmitting section 35 provided for each of M radio base stations 10 respectively.

The transmitting section 35 is provided with an inverse Fourier transform section 351, a parallel/serial conversion section 352, a guard interval insertion section 353, a carrier frequency modulation section 354 and a photoelectric conversion section 355 for each of the Nt antenna elements of each radio base station 10.

The inverse Fourier transform section 351 transforms the data signal inputted from the precoding section 34 from the frequency domain into the time domain. The inverse Fourier transform section 351 outputs the data signal transformed into the time domain to the parallel/serial conversion section 352.

The parallel/serial conversion section 352 converts the data signal sequence corresponding in number to the number of subcarriers L and the number of antenna elements inputted from the inverse Fourier transform section 351 to a serial data signal sequence corresponding in number to the number of antenna elements Nt. The parallel/serial conversion section 352 inputs the data signal sequence corresponding in number to the number of antenna elements Nt to the guard interval insertion section 353 provided for each of the Nt antenna elements.

The guard interval insertion section 353 inserts a guard interval into the data signal sequence inputted from the parallel/serial conversion section 352 and inputs the data signal sequence with the guard interval inserted to the carrier frequency modulation section 354.

The carrier frequency modulation section 354 modulates the data signal sequence inputted from the guard interval insertion section 353 into a signal with a carrier frequency and inputs the modulated data signal to the photoelectric conversion section 355.

The photoelectric conversion section 355 modulates the data signal inputted from the carrier frequency modulation section 354 from an electric signal into an optical signal and inputs the modulated data signal to the radio base station 10 via the optical fiber 20.

Each radio base station 10 is connected to the centralized station 30 via the optical fiber 20. The radio base station 10 is provided with Nt antenna elements 11 and Nt photoelectric conversion sections 12 connected to the Nt respective antenna elements 11.

The photoelectric conversion section 12 demodulates the data signal inputted from the centralized station 30 via the optical fiber 20 from an optical signal into an electric signal and inputs the demodulated data signal to the antenna element 11. The data signal inputted to the antenna element 11 is emitted into space.

As described above, the centralized station 30 generates a data signal to be inputted to each antenna element 11 of each radio base station 10 and the direction of a directional beam transmitted from each radio base station 10 is controlled through precoding in the precoding section 34.

In the above description, a plurality of types of cluster patterns 1, 2 and 3 are fixedly assigned, but autonomous dynamic assignment is also possible. Cluster patterns may be autonomously determined so that interference from neighboring clusters is minimized.

For example, as shown in FIG. 3A, suppose the radio base stations 10-1 to 10-3 transmit data signals to at least three radio terminals 50-1, 50-2 and 50-3 which are present in the cluster. As shown in FIG. 8, each centralized station 30 which controls each cluster transmits a reference signal for channel estimation to the radio base stations 10-1 to 10-3 under the control thereof. The radio base stations 10-1 to 10-3 transmit the reference signals from the centralized station 30 to the radio terminals 50-1, 50-2 and 50-3 (that is, radio terminals present in the coordinated area CL1 (FIG. 3A)) connected to the radio base stations 10-1 to 10-3.

The radio terminals 50-1, 50-2 and 50-3 perform channel estimation using the reference signals received from the respective radio base stations 10-1 to 10-3 and transmits channel information which is the channel estimation result to the respective radio base stations 10-1 to 10-3. Here, each of the radio terminals 50-1, 50-2 and 50-3 may transmit the channel estimation result of the entire frequency domain as the channel estimation information or transmit the channel estimation result of a partial frequency domain in order to prevent congestion of the uplink.

Figure 19:
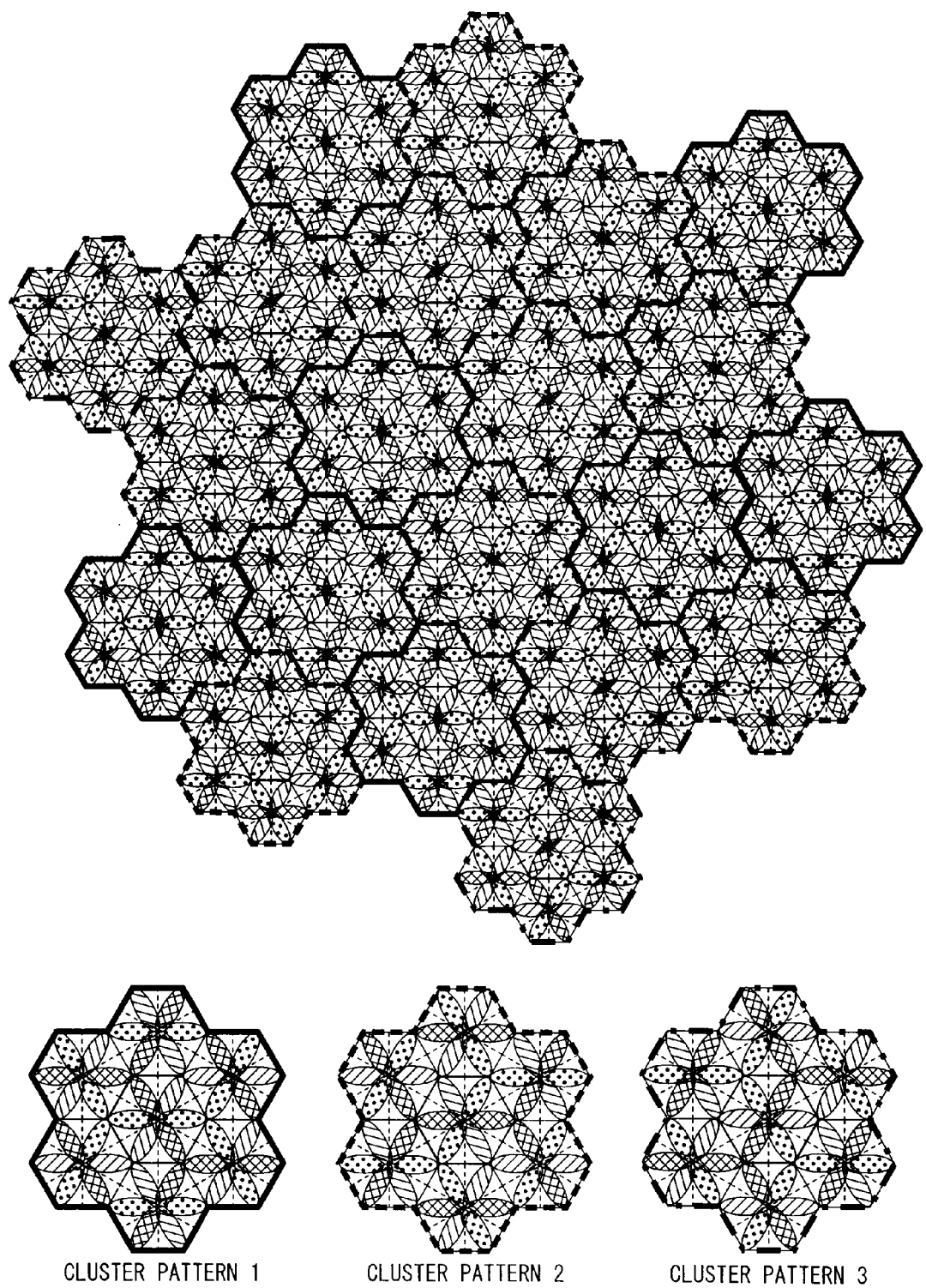
FIG. 19 is a diagram illustrating inter-cluster interference when three types of cluster patterns are dynamically arranged.
Figure 20:
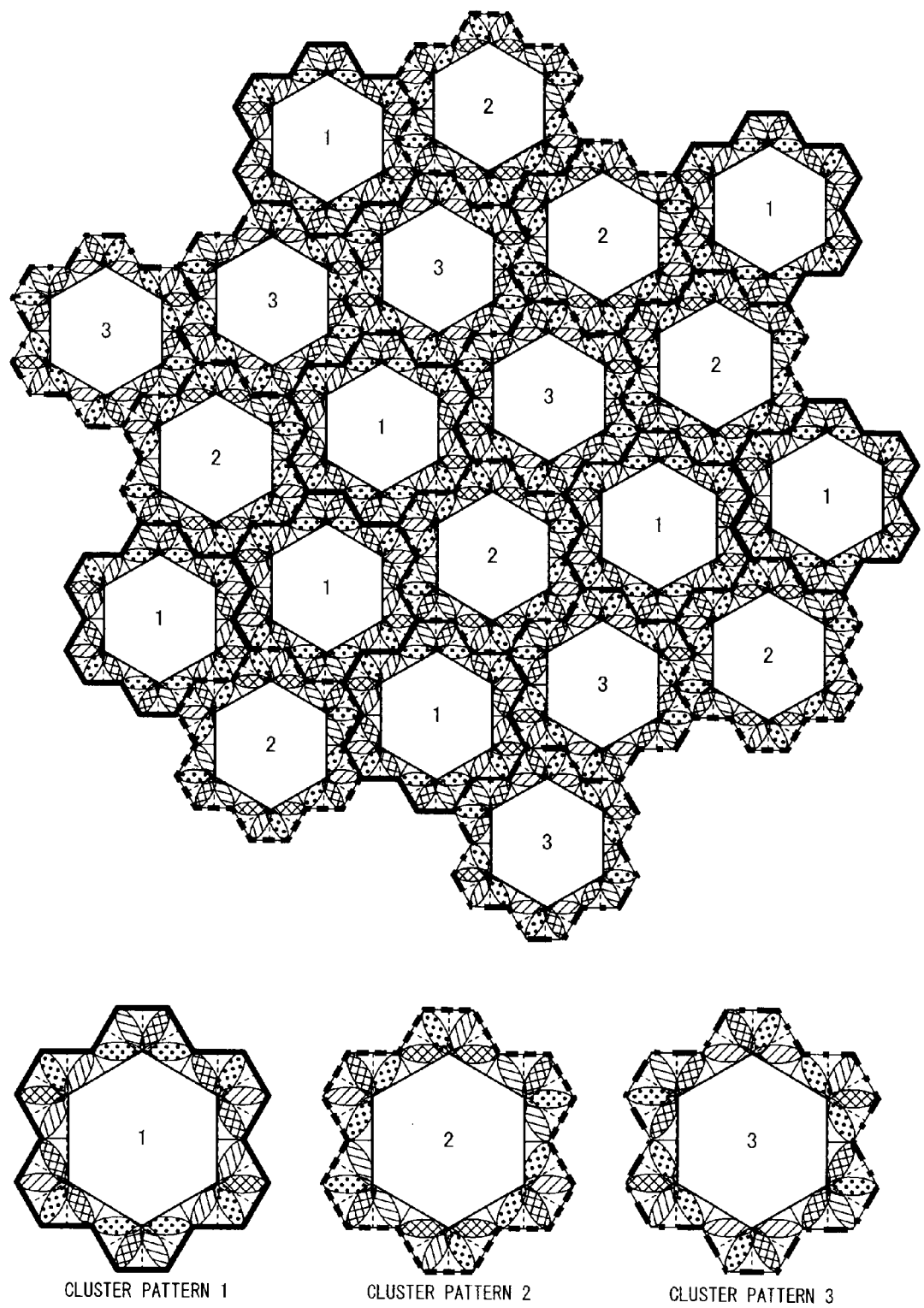
FIG. 20 is a diagram illustrating inter-cluster interference when three types of cluster patterns are dynamically arranged.

The respective radio base stations 10-1 to 10-3 transmit the channel information received from the radio terminals 50-1, 50-2 and 50-3 to the centralized station 30 and the centralized station 30 directly transmits the channel estimation information to the control station 70 which is a higher apparatus. Alternatively, the centralized station 30 may convert the channel estimation information to interference information from other clusters and transmit the interference information to the control station 70 which is a higher apparatus. The cluster pattern determining section 61 provided for the control station 70 determines cluster patterns so as to minimize interference from neighboring clusters. FIGS. 19 and 20 show examples where three cluster patterns 1, 2 and 3 are autonomously and dynamically assigned. FIG. 20 shows the assignment state similar to that in FIG. 19 and describes the assignment states of cluster patterns 1, 2 and 3 more clearly.

Figure 18:
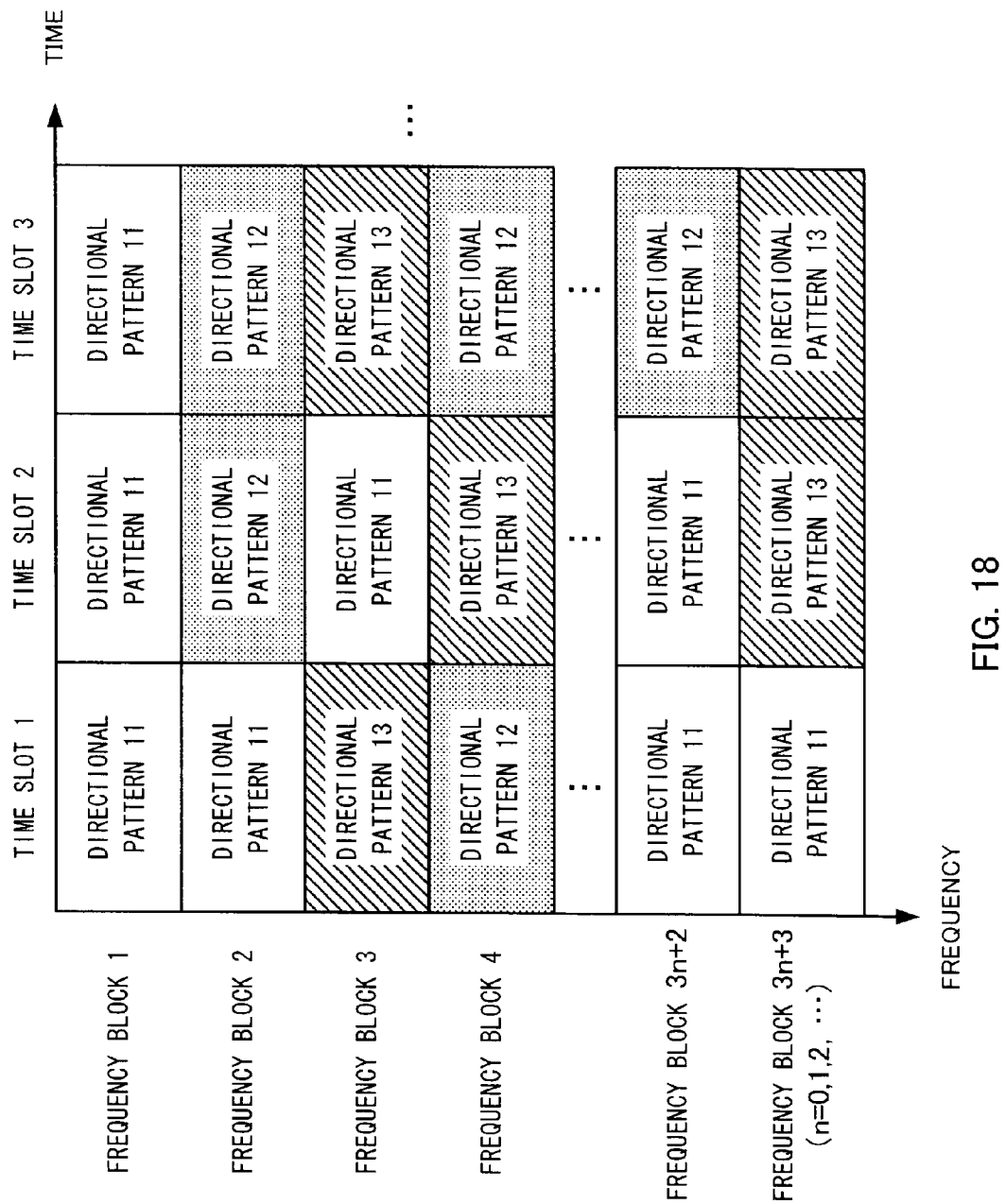
FIG. 18 is a diagram illustrating directional pattern selection information using three types of directional patterns according to Embodiment 1.

Furthermore, in the above description, as shown in FIG. 12, the relationship between a directional pattern and a frequency block in the time axis direction is fixed, but the combination of a directional pattern and a frequency block may be changed from one time slot to another as shown in FIG. 18. For example, by determining different directional patterns for a frequency block and a time slot based on, for example, the amount of traffic in a cluster, it is possible to improve throughput in the radio communication system.

In the coordinated transmission method of the aforementioned embodiment, MU-MIMO precoding may be performed using other methods such as a BD-ZF method, Zero-Forcing method, non-linear precoding, minimum mean square error (MMSE).

Thus, according to the present embodiment, a plurality of types of cluster patterns are fixedly or dynamically arranged so as to suppress interference from neighboring clusters, and it is thereby possible to expect the effects in coordinated transmission by a plurality of radio base stations of avoiding not only interference in a coordinated cluster but also interference between coordinated clusters.

In the above description, the precoding section of the centralized station performs precoding for MIMO transmission processing and generates directional pattern transmission data for each radio base station, but the function of the centralized station described in the above embodiment may also be mounted on the radio base station.

Figure 21:
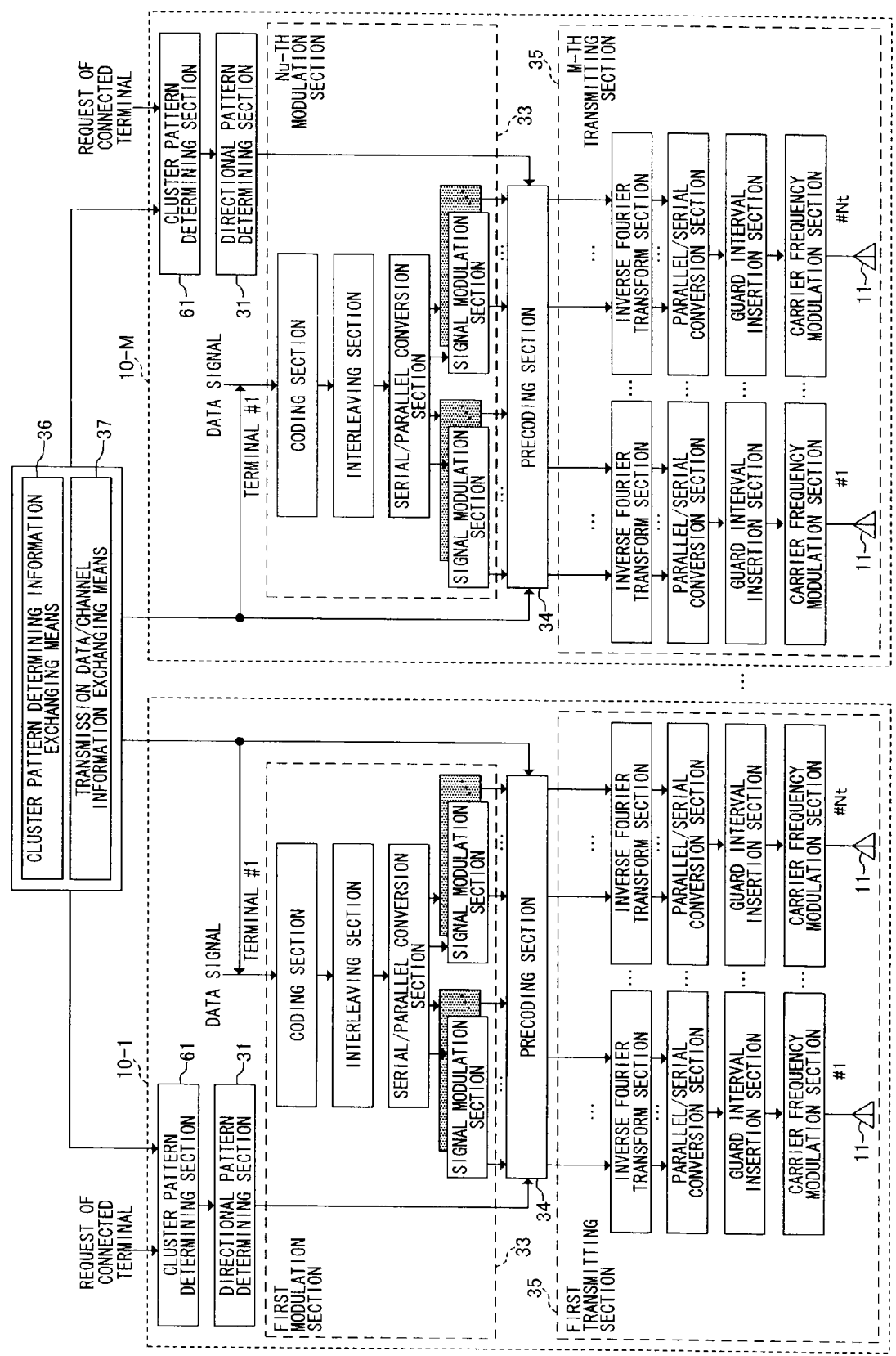
FIG. 21 is a detailed function block diagram of a radio base station according to Embodiment 2 of the present invention.

FIG. 21 shows a function block of each radio base station in a radio communication system according to Embodiment 2.

In the radio communication system of present Embodiment 2, each radio base station is provided with a precoding function for MIMO transmission processing instead of each radio base station receiving precoded transmission data for MIMO transmission processing from the centralized station. The radio communication system is composed of a plurality of radio base stations 10 (first radio base station 10-1 to M-th radio base station 10-M) having the same configuration.

The radio base station 10 is provided with a modulation section 33, a precoding section 34 and a transmitting section 35. These components have the same functions as the respective function elements in the aforementioned centralized station 30. The radio base station 10 forms a beam for each frequency block according to a directional pattern determined based on cluster patterns that can avoid interference from neighboring clusters.

A cluster pattern determining section 61 determines a cluster pattern of a cluster to which the radio base station 10 belongs based on channel estimation information from a connected terminal 50 and cluster pattern determining information of neighboring clusters from among a plurality of cluster patterns. A directional pattern determining section 31 determines a directional pattern of the radio base station 10 in frequency block units according to the determined cluster pattern. The directional pattern determined in frequency block units is given to a precoding section 34.

On the other hand, the cluster pattern determining information is reported to the radio base station 10 in the same cluster via cluster pattern determining information exchanging means 36 and also reported to the radio base stations 10 of the neighboring clusters. The cluster pattern determining section 61 in the radio base station 10 in the neighboring cluster determines a cluster pattern different from the cluster pattern determined in the neighboring cluster as a cluster pattern to be applied to the radio base stations 10. This causes different cluster patterns to be applied between neighboring clusters and makes it possible to avoid inter-cluster interference. The radio base station 10, under the control of which no target terminal is present does not constitute an interfering station causing inter-cluster interference, and therefore no cluster pattern or directional pattern determining operation needs to be performed.

Furthermore, a plurality of radio base stations 10-1 to 10-7 forming clusters share sector information of radio base stations to be coordinated before data transmission, channel information that each radio base station received from the radio terminal 50 which is the connected terminal and transmission data to the radio terminal 50 which is a coordinated transmission target via transmission data/channel information exchanging means 37.

The cluster pattern determining information exchanging means 36 and transmission data/channel information exchanging means 37 may be provided for all the radio base stations 10 or may be provided for only specific radio base stations 10 so as to notify the other radio base stations of necessary information.

What is claimed is:

1. A radio communication system provided with a plurality of radio base stations, including a plurality of clusters of radio base stations, each cluster being a plurality of radio base stations that perform coordinated transmission with each other and forming a cell with a plurality of sectors, the radio communication system comprising:
    a cluster pattern determining section configured to determine an assignment of a cluster pattern to each cluster to suppress inter-cluster interference, each cluster pattern defining a directional pattern of angles of directional beams to be emitted from respective radio base stations within each cluster such that each radio base station within a respective cluster emits beams at a same directional pattern of angles for a given frequency block, and at least two neighboring clusters are assigned different cluster patterns at a same frequency such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency; and
    a directional pattern determining section configured to assign directional patterns of angles of directional beams to the plurality of clusters for each frequency block based on the cluster pattern determined by the cluster pattern determining section, wherein:
    the plurality of radio base stations form directional beams according to the directional pattern of angles of directional beams in the same time slot and coordinate data transmission between sectors through multiuser multiple-input multiple-output (MIMO) transmission between directional beams of one radio base station and another radio base station having sectors adjacent to each other in a cluster and facing each other at the same frequency block.

2. The radio communication system according to claim 1, wherein the cluster pattern assigned to each cluster is fixed.

3. The radio communication system according to claim 1, wherein the cluster pattern assigned to the each cluster is dynamically switched according to a detected inter-cluster interference.

4. The radio communication system according to claim 1, wherein the cluster pattern determining section is configured to determine the assignment of a cluster pattern to each cluster to suppress inter-cluster interference less than or equal to a predetermined value.

5. The radio communication system according to claim 1, wherein each cluster pattern defines a first directional pattern of angles of directional beams for a first frequency block and a second directional pattern of angles of directional beams, which is different than the first directional pattern, for a second frequency block.

6. A centralized station in a radio communication system provided with a plurality of radio base stations, including a plurality of clusters of radio base stations, each cluster being a plurality of radio base stations that perform coordinated transmission with each other and forming a cell with a plurality of sectors, the centralized station integrating radio base stations into one of the clusters, comprising:
    a cluster pattern determining section configured to determine an assignment of a cluster pattern to each cluster to suppress inter-cluster interference, each cluster pattern defining a directional pattern of angles of directional beams to be emitted from respective radio base stations within each cluster such that each radio base station within a respective cluster emits beams at a same directional pattern of angle for a given frequency block, and at least two neighboring clusters are assigned different cluster patterns at a same frequency block such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency;
    a directional pattern determining section configured to assign a directional pattern of angles of directional beams to the plurality of clusters for each frequency block based on the cluster pattern determined by the cluster pattern determining section;
    a signal distribution section configured to distribute to a plurality of radio base stations of a same cluster, data signals for coordinated transmission within the cluster; and
    a precoding section configured to precode the distributed data signals by the signal distribution section, the precoded data signals being transmitted on directional beams over the directional pattern of angles of directional beams assigned for each frequency block by the directional pattern determining section.

7. A control station apparatus in a radio communication system provided with a plurality of radio base stations, including a plurality of clusters of radio base stations, each cluster being a plurality of radio base stations that perform coordinated transmission with each other and forming a cell with a plurality of sectors, the control station apparatus configured to manage a centralized station that integrates radio base stations into one of the clusters, comprising:
  a cluster pattern determining section configured to determine an assignment of a cluster pattern to each cluster to suppress inter-cluster interference, each cluster pattern defining a directional pattern of angles of directional beams to be emitted from respective radio base stations within each cluster such that each radio base station within a respective cluster emits beams at a same directional pattern of angles for a given frequency block, and at least two neighboring clusters are assigned different cluster patterns at a same frequency such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency;
  a notifying section configured to notify the each centralized station of the cluster pattern determined by the cluster pattern determining section.

8. A radio base station that forms a cell with a plurality of sectors together with other neighboring radio base stations in a radio communication system, the radio communication system being provided with a plurality of radio base stations, including a plurality of clusters of radio base stations, each cluster being a plurality of radio base stations that perform coordinated transmission with each other and forming a cell with a plurality of sectors, the radio base station comprising:
  a cluster pattern determining section configured to determine an assignment of a cluster pattern to each cluster to suppress inter-cluster interference, each cluster pattern defining a directional pattern of angles of directional beams to be emitted from respective radio base stations within each cluster such that each radio base station within a respective cluster emits beams at a same directional pattern of angles for a given frequency block, and at least two neighboring clusters are assigned different cluster patterns at a same frequency block such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency;
  a directional pattern determining section configured to assign a directional pattern of angles of directional beams to the base station for each frequency block based on the cluster pattern determined by the cluster pattern determining section; and
  a precoding section configured to form beams within a directional pattern of angles of directional beams assigned for each frequency block by the directional pattern determining section using multiuser multiple-input multiple-output (MIMO) precoding to transmit data signals in a coordinated manner in the cluster.

9. A coordinated transmission method for a radio communication system provided with a plurality of radio base stations each forming a cell with a plurality of sectors, comprising the steps of:
  determining an assignment of a cluster pattern to each cluster to suppress inter-cluster interference, each cluster pattern defining a directional pattern of angles of directional beams to be emitted from respective radio base stations within each cluster such that each radio base station within a respective cluster emits beams at a same directional pattern of angles for a given frequency block, and at least two neighboring clusters are assigned different cluster patterns at a same frequency block such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency; and
  assigning directional patterns of angles of directional beams to the plurality of clusters for each frequency block based on the determined cluster pattern, wherein:
  the plurality of radio base stations form directional beams according to the directional pattern of angles of directional beams in the same time slot and coordinate data transmission between sectors through multiuser multiple-input multiple-output (MIMO) transmission between directional beams of one radio base station and another radio base station having sectors adjacent to each other in a cluster and facing each other at the same frequency.

10. A radio communication system provided with a plurality of radio base stations, including a plurality of clusters of radio base stations, each cluster being a plurality of radio base stations that perform coordinated transmission with each other and forming a cell with a plurality of sectors, the radio communication system comprising:
  a cluster pattern determining section configured to determine an assignment of a cluster pattern to each cluster to suppress inter-cluster interference, each cluster pattern defining a directional pattern of angles of directional beams to be emitted from respective radio base stations within each cluster such that each radio base station within a respective cluster is assigned a predetermined directional pattern of angles for a given frequency block, and at least two neighboring clusters are assigned different cluster patterns at a same frequency block such that a first cluster of the neighboring clusters is assigned a first cluster pattern in which each radio base station emits directional beams at a first directional pattern of angles for a certain frequency, and a second cluster of the neighboring clusters is assigned a second cluster pattern in which each radio base station emits directional beams at a second directional pattern of angles, which is different than the first directional pattern of angles, at the certain frequency; and
  a directional pattern determining section configured to assign directional patterns of angles of directional beams to the plurality of clusters for each frequency block based on the cluster pattern determined by the cluster pattern determining section, wherein:

the plurality of radio base stations form directional beams according to the directional pattern of angles of directional beams in the same time slot and coordinate data transmission between sectors through multiuser multiple-input multiple-output (MIMO) transmission between directional beams of one radio base station and another radio base station having sectors adjacent to each other in a cluster and facing each other at the same frequency block.

11. The radio communication system according to claim 10, wherein at least two radio base stations within a respective cluster are assigned a different predetermined directional pattern of angles for a given frequency block.

* * * * *